(12) United States Patent
Futatsugi

(10) Patent No.: US 7,844,016 B2
(45) Date of Patent: Nov. 30, 2010

(54) RADIO TRANSMITTING APPARATUS AND RADIO RECEIVING APPARATUS

(75) Inventor: Yasunori Futatsugi, Tokyo (JP)

(73) Assignee: Nec Corporation, Tokyo (JP)

( * ) Notice: Subject to any disclaimer, the term of this patent is extended or adjusted under 35 U.S.C. 154(b) by 659 days.

(21) Appl. No.: 11/837,560

(22) Filed: Aug. 13, 2007

(65) Prior Publication Data
US 2008/0310529 A1  Dec. 18, 2008

(30) Foreign Application Priority Data
Aug. 22, 2006  (JP)  ............................. 2006-225249

(51) Int. Cl.
H04L 27/00  (2006.01)
(52) U.S. Cl. ..................................... 375/299
(58) Field of Classification Search ................. 375/260, 375/284, 296, 299, 346, 347
See application file for complete search history.

(56) References Cited

U.S. PATENT DOCUMENTS
2006/0111050 A1*  5/2006  Choi et al. ............... 455/67.11

FOREIGN PATENT DOCUMENTS
JP  10-215235  8/1998
JP  2004-153498  5/2004
JP  2005-348235  12/2005
JP  2005-348236  12/2005

* cited by examiner

Primary Examiner—Kevin Y Kim
(74) Attorney, Agent, or Firm—Young & Thompson

(57) ABSTRACT

A radio transmitting apparatus includes a calibration reference signal generator for generating a calibration reference signal for each of the subcarriers to be calibrated, a subcarrier modulator for modulating the calibration reference signal with the subcarrier, a radio transmitter for frequency-converting a baseband signal, which is the modulated signal, into a transmission signal in a radio frequency band, a radio receiver for frequency-converting the transmission signal in the radio frequency band supplied from the radio transmitter, into a baseband signal, a calibration coefficient measurer for calculating a calibration coefficient from the baseband signal output from the radio receiver, and a calibration coefficient multiplier for multiplying a transmission signal for each of the subcarriers and each of the antenna elements, by the calculated calibration coefficient.

30 Claims, 25 Drawing Sheets

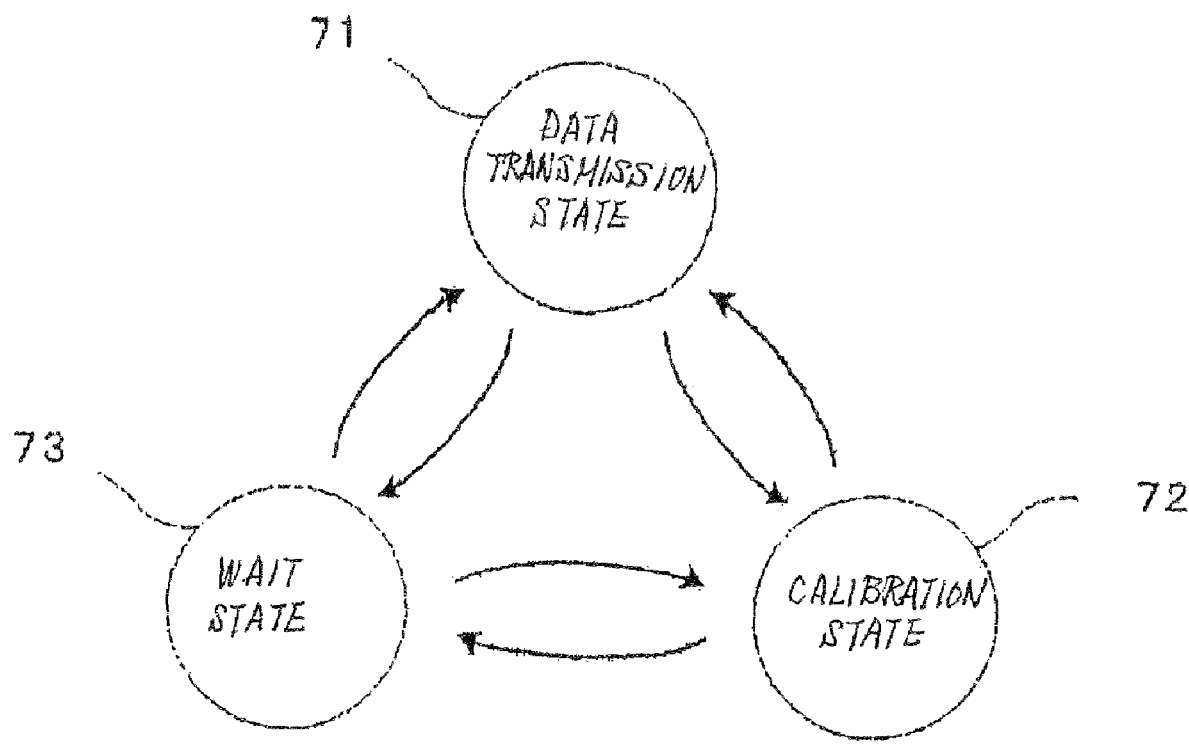
F I G. 20

| SUBCARRIER #3 CALIBRATION COEFFICIENT DEVIATION LEVEL | SUBCARRIER #3 SETTING TIME IN CALIBRATION TIMER $T_3$ |
| --- | --- |
| 5 | 1 |
| 4 | 2 |
| 3 | 3 |
| 2 | 4 |
| 1 | 5 |

FIG. 23

RADIO TRANSMITTING APPARATUS AND RADIO RECEIVING APPARATUS

This application is based upon and claims the benefit of priority from Japanese patent application No. 2006-225249, filed on Aug. 22, 2006, the disclosure of which is incorporated herein in its entirety by reference.

BACKGROUND OF THE INVENTION

1. Field of the Invention

The present invention relates to a radio transmitting apparatus and a radio receiving apparatus which employ array antenna technology.

2. Description of the Related Art

Array antenna is a technology for performing radio communications using a plurality of antenna elements. According to array antenna technology, the antenna elements are appropriately weighted to electrically control the directivity of the array antenna into a desired direction for thereby reducing interference between paths or users. It is also known according to array antenna technology to improve reception characteristics by giving phase rotation to a plurality of transmission antenna elements.

For an array antenna to operate effectively, it is necessary to equalize in advance amplitude characteristics and phase characteristics of the antenna elements. However, since RF circuits of a radio transmitting and receiving system are analog circuits and analog signals are sent between the radio transmitting and receiving apparatus and the antenna elements, it is not easy to equalize the amplitude characteristics and phase characteristics of the antenna elements. With radio transmitting and receiving systems based on array antenna technology, it is customary to carry out a calibrating process to correct the amplitude characteristics and phase characteristics of the antenna elements.

In recent years, the orthogonal frequency-division multiplexing (OFDM) transmission technique for transmitting a signal with a plurality of orthogonal subcarriers has been adopted by various radio standards. One example of a radio transmitting and receiving apparatus for calibrating the amplitude characteristics and phase characteristics of the antenna elements according to the OFDM transmission technique is disclosed in Japanese Patent Laid-Open No. 2005-348236.

As shown in FIG. 1 of the accompanying drawings, Japanese Patent Laid-Open No. 2005-348236 reveals an antenna array transmitting apparatus including calibration coefficient multipliers 81-1 through 81-B (B represents a positive number), inverse fast Fourier transformers 82-1 through 82-B, radio transmitters 83-1 through 83-B, antenna elements 84-1 through 84-B, radio receiver 91, fast Fourier transformer 92, and calibration value measurer 93.

Calibration coefficient multipliers 81-1 through 81-B multiply transmission baseband signals from branches #1 through #B which have been modulated and multiplied by weights, by calibration coefficients supplied from calibration value measurer 93, and output multiplied results (baseband signals) to inverse fast Fourier transformers 82-1 through 82-B.

Inverse fast Fourier transformers 82-1 through 82-B perform inverse Fourier transform on the baseband signals supplied from calibration coefficient multipliers 81-1 through 81-B, and output the transformed baseband signals to radio transmitters 83-1 through 83-B.

Radio transmitters 83-1 through 83-B convert the baseband signals supplied from inverse fast Fourier transformers 82-1 through 82-B into RF (Radio Frequency) signals, and output the RF signals to antenna elements 84-1 through 84-B and radio receiver 91.

Radio receiver 91 selects one signal, which corresponds to the branch to be calibrated, from among the RF signals supplied from the output terminals of radio transmitters 83-1 through 83-B, converts the selected RF signal into a baseband signal, and outputs the baseband signal to fast Fourier transformer 92.

Fast Fourier transformer 92 performs fast Fourier transform (FFT) on the baseband signal supplied from radio receiver 91, thereby producing a branch-specific reception signal. Fast Fourier transformer 92 outputs the produced reception signal to calibration value measurer 93.

Calibration value measurer 93 compares branch-specific reception signals supplied from fast Fourier transformer 92 with each other to calculate amplitude deviations and phase deviations between the branches, and calculates calibration coefficients based on the amplitude deviations and the phase deviations. Calibration value measurer 93 outputs the calculated calibration coefficients to corresponding calibration coefficient multipliers 81-1 through 81-B.

Calibration coefficient multipliers 81-1 through 81-B shown in FIG. 1 will be described below with reference to FIG. 2 of the accompanying drawings.

FIG. 2 shows conventional calibration coefficient multiplier 81 associated with a single branch.

As shown in FIG. 2, calibration coefficient multiplier 81 includes serial/parallel (S/P) converter 811 and multipliers 812-1 through 812-S (S represents a positive number).

Serial/parallel converter 811 converts a serial transmission baseband signal that has been multiplied by a weight into parallel baseband signals corresponding to a plurality of subcarriers, and outputs the parallel baseband signals to multipliers 812-1 through 812-S.

Multipliers 812-1 through 812-S multiply the baseband signals supplied from serial/parallel converter 811 by calibration coefficients supplied from calibration value measurer 93, and outputs multiplied results to inverse fast Fourier transformers 82-1 through 82-B.

According to the related art described above, calibration coefficients corresponding to respective branches or subcarriers are calculated and used to correct the amplitude characteristics and phase characteristics of the branches for highly accurate calibration.

However, the above radio transmitting and receiving apparatus of the related art is problematic in that since discrete Fourier transform is required for calculating calibration coefficients, the amount of arithmetic operation required to calculate calibration coefficients is large. Therefore, the hardware scale of the radio transmitting and receiving apparatus tends to become so large that it may be difficult to decrease the size of the radio transmitting and receiving apparatus and to install the radio transmitting and receiving apparatus. If the above related art is applied to a portable terminal, then the power consumption of the portable terminal increases and the operating time of the portable terminal that is battery-powered decreases.

The above radio transmitting and receiving system of the related art calibrates all the subcarriers for the respective branches at once. Consequently, it is impossible for the radio transmitting and receiving system to control the calibration period flexible for each subcarrier depending on the need for calibration, and is difficult to reduce power consumption.

SUMMARY OF THE INVENTION

It is an object of the present invention to provide a radio transmitting apparatus and a radio receiving apparatus which are capable of performing a calibrating process highly accurately for each subcarrier and of preventing an increase in the size of the hardware and in power consumption.

Another object of the present invention is to provide a radio transmitting apparatus and a radio receiving apparatus which are capable of controlling a calibration period for each subcarrier.

To achieve the above objects, in accordance with the present invention, a calibration reference signal or a modulation signal for use in calibration is generated for each of subcarriers. These signals are processed into a demodulation signal or a modulation signal, the amplitude and phase of which are measured, and a calibration coefficient is determined from the measured amplitude and phase values.

The above process does not require fast Fourier transform which involves a large amount of arithmetic operation for separating a plurality of subcarriers, as is the case with the related art. Therefore, the amount of arithmetic operations required to calculate calibration coefficients is reduced. Accordingly, it is possible to perform highly accurate calibration for each subcarrier, and the hardware scale and power consumption are prevented from increasing. Since the calibration reference signal or the modulation signal for use in calibration is generated for each subcarrier, the period for carrying out calibration can be controlled for each subcarrier. As a result, the calibration period can be flexibly controlled for reduced power consumption.

The above and other objects, features, and advantages of the present invention will become apparent from the following description with reference to the accompanying drawings, which illustrate examples of the present invention.

BRIEF DESCRIPTION OF THE DRAWINGS

FIG. 20 is a diagram showing an example of state transitions of the radio transmitting and receiving system according to the present invention;

FIG. 23 is a diagram showing an example of a table used to determine a set time for the calibration period timer;

DETAILED DESCRIPTION OF THE PREFERRED EMBODIMENTS

First Exemplary Embodiment

A radio transmitting and receiving system according to a first exemplary embodiment of the present invention will be described below with reference to the drawings.

The radio transmitting and receiving system according to the first exemplary embodiment serves as a radio transmitting apparatus (multicarrier transmitting apparatus) having B antenna elements (B represents a positive number).

Figure 1:
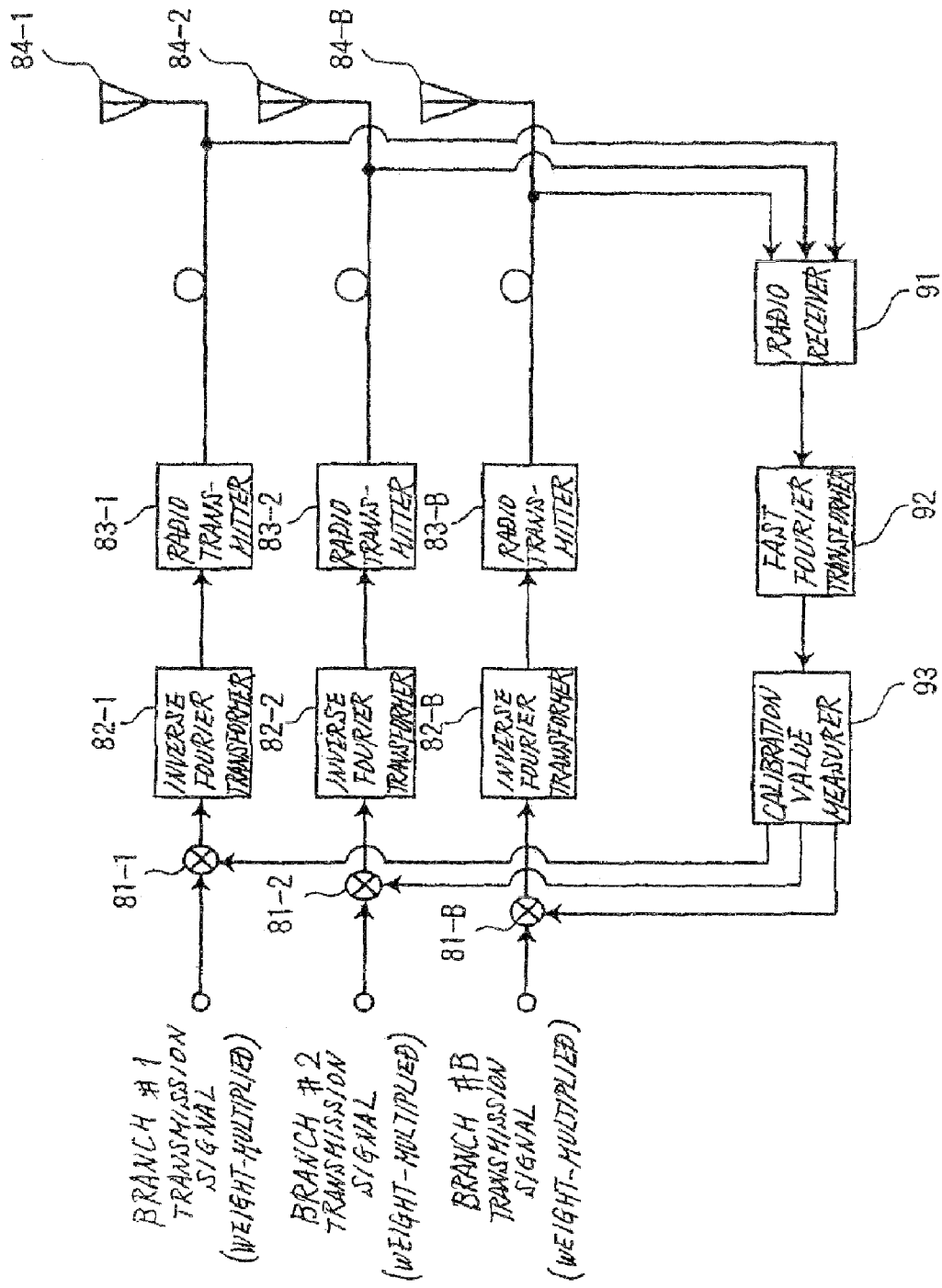
FIG. 1 is a block diagram of a radio transmitting apparatus of a radio transmitting and receiving system according to the related art.
Figure 2:
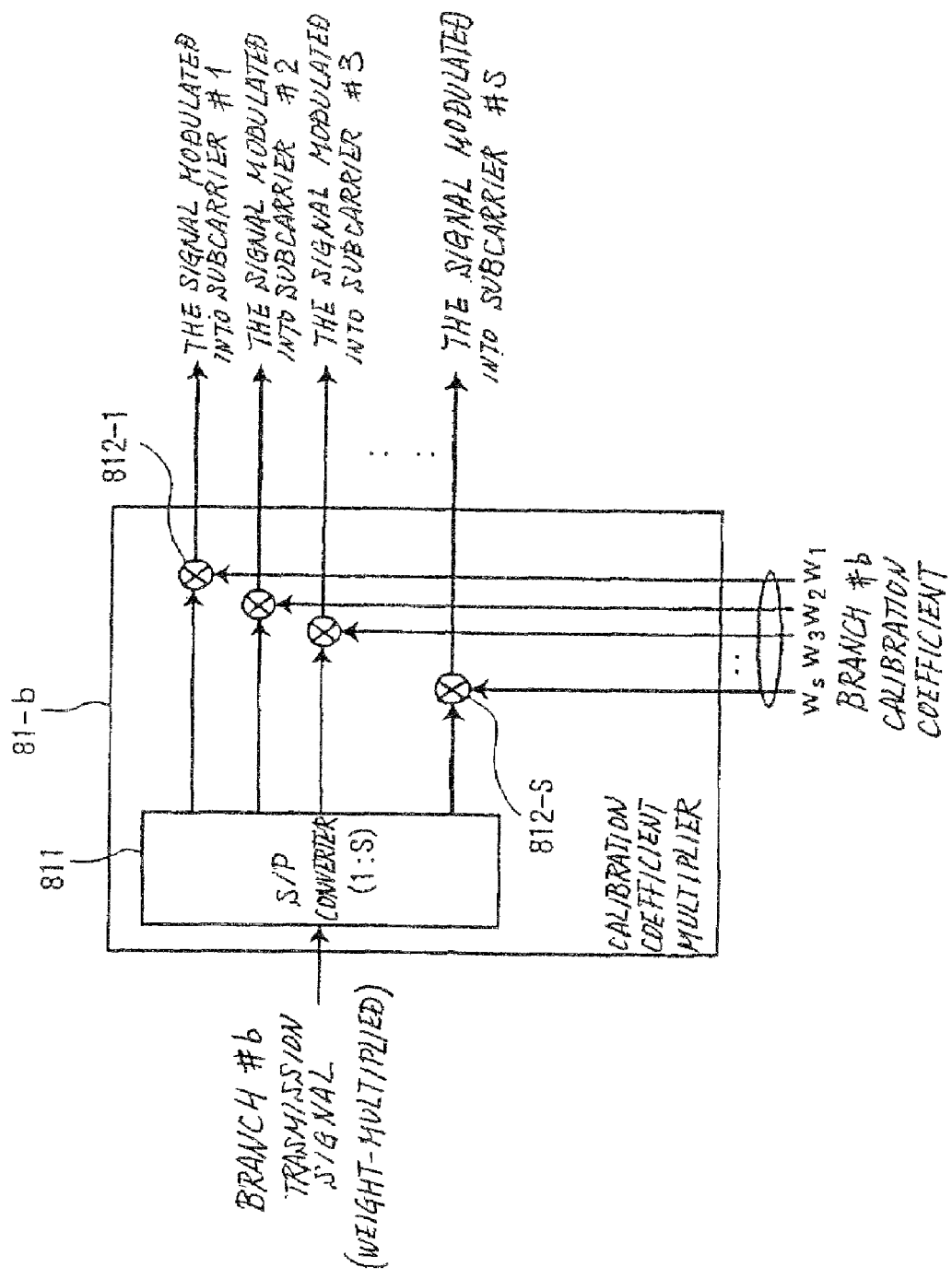
FIG. 2 is a block diagram of a calibration coefficient multiplier of the radio transmitting apparatus shown in FIG. 1.
Figure 3:
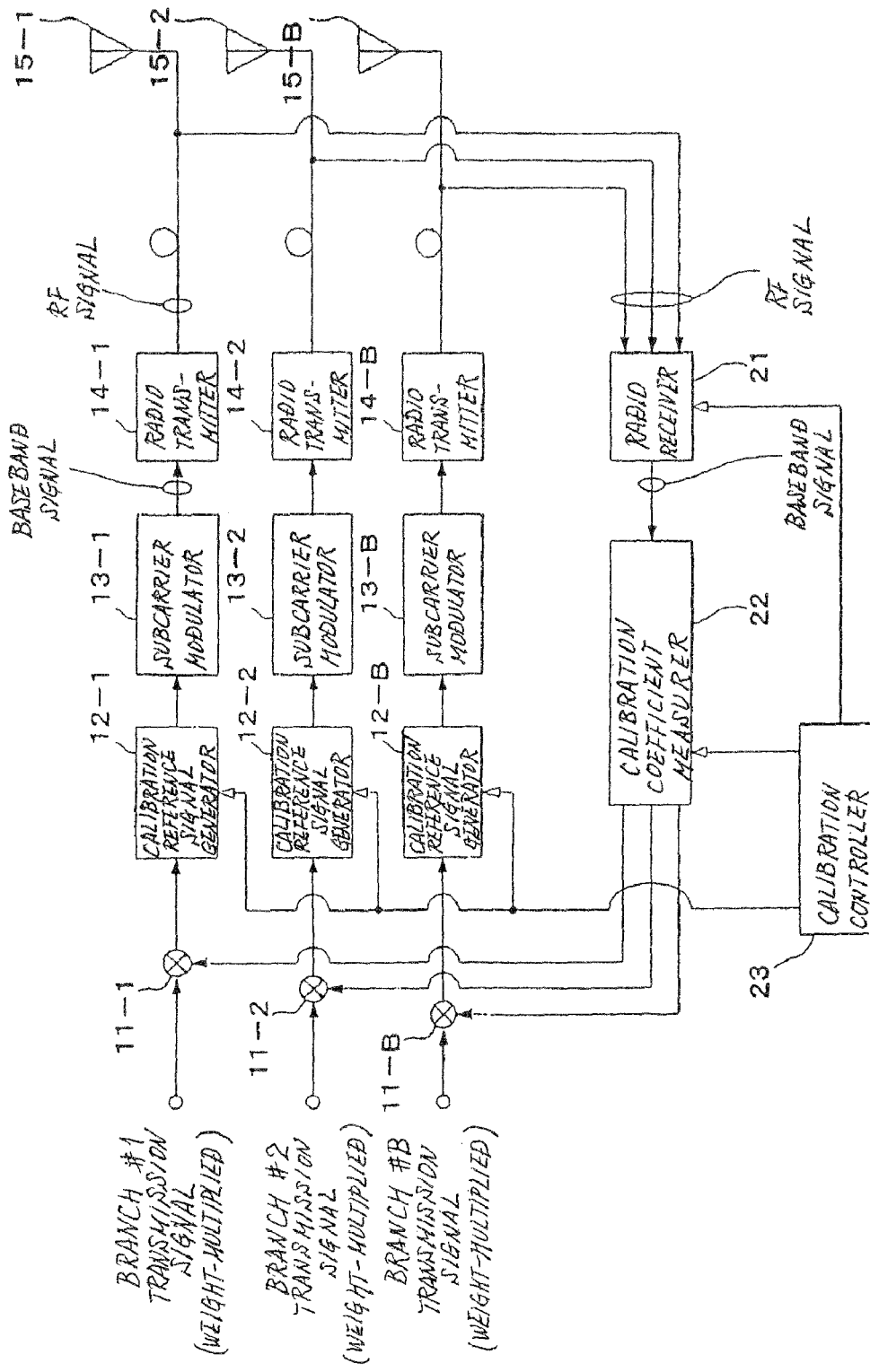
FIG. 3 is a block diagram of a radio transmitting and receiving system, which serves as a radio transmitting apparatus, according to a first exemplary embodiment of the present invention.

As shown in FIG. 3, the radio transmitting apparatus according to the first exemplary embodiment comprises calibration coefficient multipliers 11-1 through 11-B, calibration reference signal generators 12-1 through 12-B, subcarrier modulators 13-1 through 13-B, radio transmitters 14-1 through 14-B, antenna elements 15-1 through 15-B, radio receiver 21, calibration coefficient measurer 22, and calibration controller 23.

Calibration coefficient multipliers 11-1 through 11-B multiply transmission baseband signals from branches #1 through #B which have been modulated and multiplied by weights, by calibration coefficients supplied from calibration coefficient measurer 22, and output multiplied results (transmission baseband signals) to calibration reference signal generators 12-1 through 12-B. Calibration coefficient multipliers 11-1 through 11-B are provided in association with respective subcarriers, and are capable of multiplying transmission baseband signals by different calibration coefficients.

In a normal mode, calibration reference signal generators 12-1 through 12-B output the transmission baseband signals supplied from calibration coefficient multipliers 11-1 through 11-B to subcarrier modulators 13-1 through 13-B. In a calibration mode, calibration reference signal generators 12-1 through 12-B generate calibration reference signals, which are basic signals used for calibration, and output the generated calibration reference signals to subcarrier modulators 13-1 through 13-B.

Subcarrier modulators 13-1 through 13-B modulate corresponding sub-carriers with the signals supplied from calibration reference signal generators 12-1 through 12-B, and output the modulated signals to radio transmitters 14-1 through 14-B.

Radio transmitters 14-1 through 14-B convert the baseband signals supplied from subcarrier modulators 13-1 through 13-B from digital signals into analog signals, upconvert the analog signals into RF signals, and output the RF signals to antenna elements 15-1 through 15-B and radio receiver 21.

Radio receiver 21 downconverts one signal, which corresponds to a subcarrier to be calibrated, from among the RF signals supplied from the output terminals of radio transmitters 14-1 through 14-B, into a baseband signal, converts the baseband signal from an analog signal into a digital signal, and outputs the baseband signal to calibration coefficient measurer 22. The signal output from radio receiver 21 will hereinafter referred to as "reference signal".

Calibration coefficient measurer 22 determines amplitude deviations and phase deviations between the branches from the baseband signal output from radio receiver 21, and calculates calibration coefficients based on the values of the amplitude deviations and the phase deviations, and outputs the calculated calibration coefficients to corresponding calibration coefficient multipliers 11-1 through 11-B.

Calibration controller 23 controls a calibrating operation of the radio transmitting apparatus which is performed by calibration reference signal generators 12-1 through 12-B, calibration coefficient measurer 22, and radio receiver 21. Calibration controller 23 may be implemented by a CPU which operates according to a program stored in a recording medium or an LSI circuit which comprises a combination of various logic circuits, for example.

Calibration coefficient multipliers 11-1 through 11-B and calibration reference signal generators 12-1 through 12-B shown in FIG. 3 will be described below with reference to FIG. 4.

Figure 4:
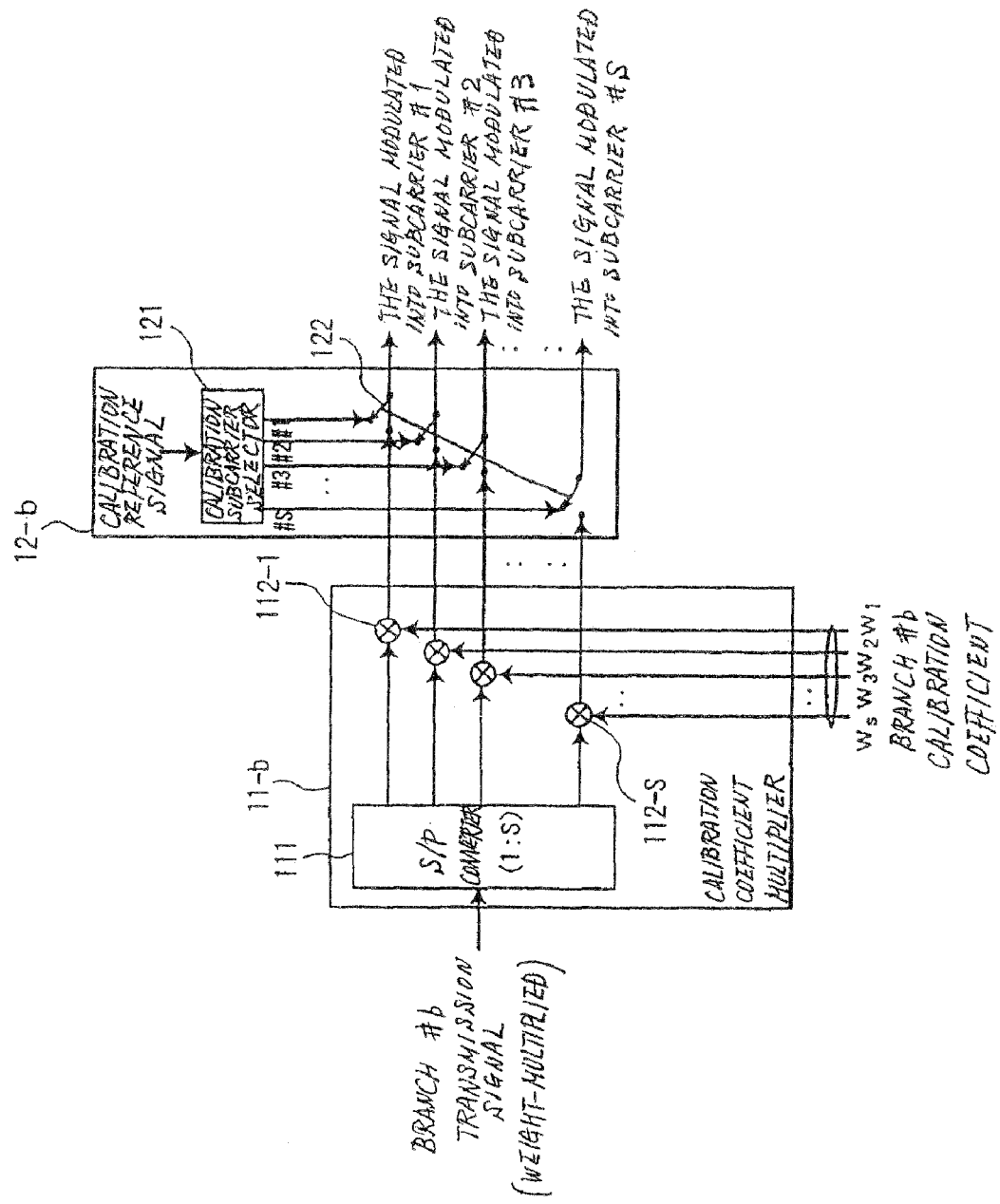
FIG. 4 is a block diagram of a calibration coefficient multiplier and a calibration reference signal generator shown in FIG. 3.

FIG. 4 shows in block form an example of a calibration coefficient multiplier and a calibration reference signal generator shown in FIG. 3, which are associated with one branch.

As shown in FIG. 4, calibration coefficient multiplier 11 includes serial/parallel (S/P) converter 111 and multipliers 112-1 through 112-S.

Serial/parallel converter 111 converts a serial transmission baseband signal that has been multiplied by a weight into parallel baseband signals corresponding to a plurality of subcarriers, and outputs the parallel baseband signals to multipliers 112-1 through 112-S.

Multipliers 112-1 through 112-S multiply the baseband signals supplied from serial/parallel converter 111 by calibration coefficients supplied from calibration coefficient measurer 22, and outputs multiplied results to calibration reference signal generator 12.

Calibration reference signal generator 12 includes calibration subcarrier selector 121 and calibration reference signal switcher 122.

Calibration subcarrier selector 121 selects one subcarrier to be calibrated according to an instruction from calibration controller 23, and outputs a calibration reference signal for the selected subcarrier to calibration reference signal switcher 122. At this time, calibration subcarrier selector 121 outputs "0" as calibration reference signals for unselected subcarriers.

Calibration reference signal switcher 122 outputs one signal from among the signals supplied from calibration subcarrier selector 121 and calibration coefficient multiplier 11 to subcarrier modulator 13.

Calibration coefficient measurer 22 shown in FIG. 3 will be described below with reference to FIG. 5.

Figure 5:
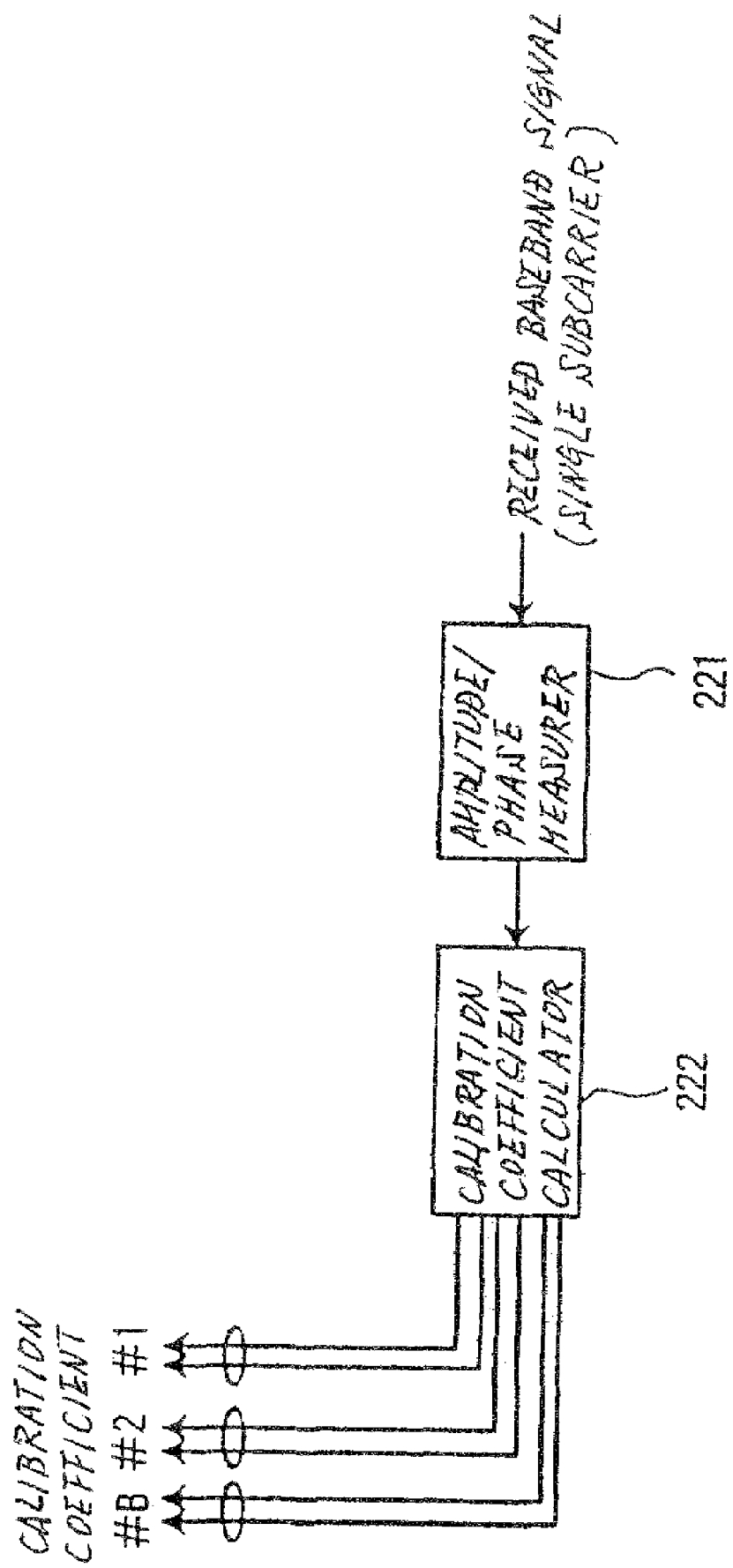
FIG. 5 is a block diagram of a calibration coefficient measurer shown in FIG. 3.

FIG. 5 shows in block from an example of calibration coefficient measurer 22 shown in FIG. 3.

As shown in FIG. 5, calibration coefficient measurer 22 includes an amplitude/phase measurer 221 and calibration coefficient calculator 222.

Amplitude/phase measurer 221 measures the amplitude and phase of a signal supplied from radio receiver 21 and outputs the respective measured values to calibration coefficient calculator 222.

Calibration coefficient calculator 222 determines amplitude deviations and phase deviations from the measured values supplied from amplitude/phase measurer 221, and calculates calibration coefficients from the amplitude deviations and the phase deviations. Calibration coefficient calculator 222 has a memory device which stores the calculated calibration coefficients. Calibration coefficient calculator 222 outputs the calculated calibration coefficients for the subcarriers always to calibration coefficient multipliers 112-1 through 112-S for all the branches.

A process of calculating calibration coefficients of the radio transmitting apparatus shown in FIG. 3 will be described below with reference to FIG. 6.

In the illustrated process, a branch corresponding to antenna element 15-1 is used as a reference branch for calibration, and calibration coefficients are determined to equalize the amplitudes and phases of the branches, which correspond to remaining antenna elements 15-2 through 15-B, to those of the branch corresponding to antenna element 15-1. The number of subcarriers is represented by S (S is a positive number).

First, calibration controller 23 controls calibration reference signal switcher 122 for each calibration reference signal generators 12-1 through 12-B to select a calibration reference signal to be output from calibration sub-carrier selector 121 in step A1.

Then, calibration controller 23 substitutes "1" in variable s (s=1, 2, . . . , S) indicative of a subcarrier number to be calibrated in step A2, and substitutes "1" in variable b (b=1, 2, . . . , B) indicative of a branch number in step A3, thereby initializing variables s, b.

Then, calibration controller 23 controls radio receiver 21 to select an RF signal from branch #1, and outputs a signal downconverted from the selected RF signal in step A4.

Calibration controller 23 controls calibration subcarrier selector 121 for each calibration reference signal generators 12-1 through 12-B to output a calibration reference signal for subcarrier #s and which is to be calibrated. Calibration controller 23 also controls calibration subcarrier selector 121 to output "0" as calibration reference signals for the subcarriers other than sub-carrier #s in step A5.

Calibration controller 23 controls amplitude/phase measurer 221 of calibration coefficient measurer 22 to measure the amplitude and phase of the calibration reference signal for branch #1 which has been output from radio receiver 21, and controls calibration coefficient calculator 222 to store the measured amplitude and phase values in step A6.

Then, calibration controller 23 adds "1" to variable b in step A7.

Calibration controller 23 controls radio receiver 21 to select an RF signal from branch #2 in step A8, and controls amplitude/phase measurer 221 of calibration coefficient measurer 22 to measure the amplitude and phase of the calibration reference signal for branch #2 in step A9. Then, calibration controller 23 controls calibration coefficient calculator 222 to determine an amplitude deviation and a phase deviation between branches #1, #2 from the amplitude and phase values of branch #2 and the stored amplitude and phase values of branch #1, and to calculate a calibration coefficient for branch #2 from the determined amplitude and phase deviations. Calibration controller 23 stores the determined calibration coefficient in the memory device of calibration coefficient calculator 222, updating the value (calibration coefficient) to be output to calibration coefficient multiplier 11-2 in step A10.

Then, calibration controller 23 judges whether the value of variable b is greater than B-1 or not in step A11. If the value of variable b is not greater than B-1, then control goes back to step A7 to repeat the processing of steps A7 through A11.

If the value of variable b is greater than B-1, then calibration controller 23 judges whether the value of variable s is greater than S-1 or not in step A12. If the value of variable s is not greater than S-1, then calibration controller 23 adds "1" to variable s in step A13, after which control goes back to step A3 to repeat the processing of steps A3 through A12.

If the value of variable s is greater than S-1, then calibration controller 23 controls calibration reference signal switcher 122 for each calibration reference signal generators 12-1 through 12-B to select a transmission baseband signal supplied from one of calibration coefficient multipliers 11-1 through 11-B in step A14.

Figure 6:
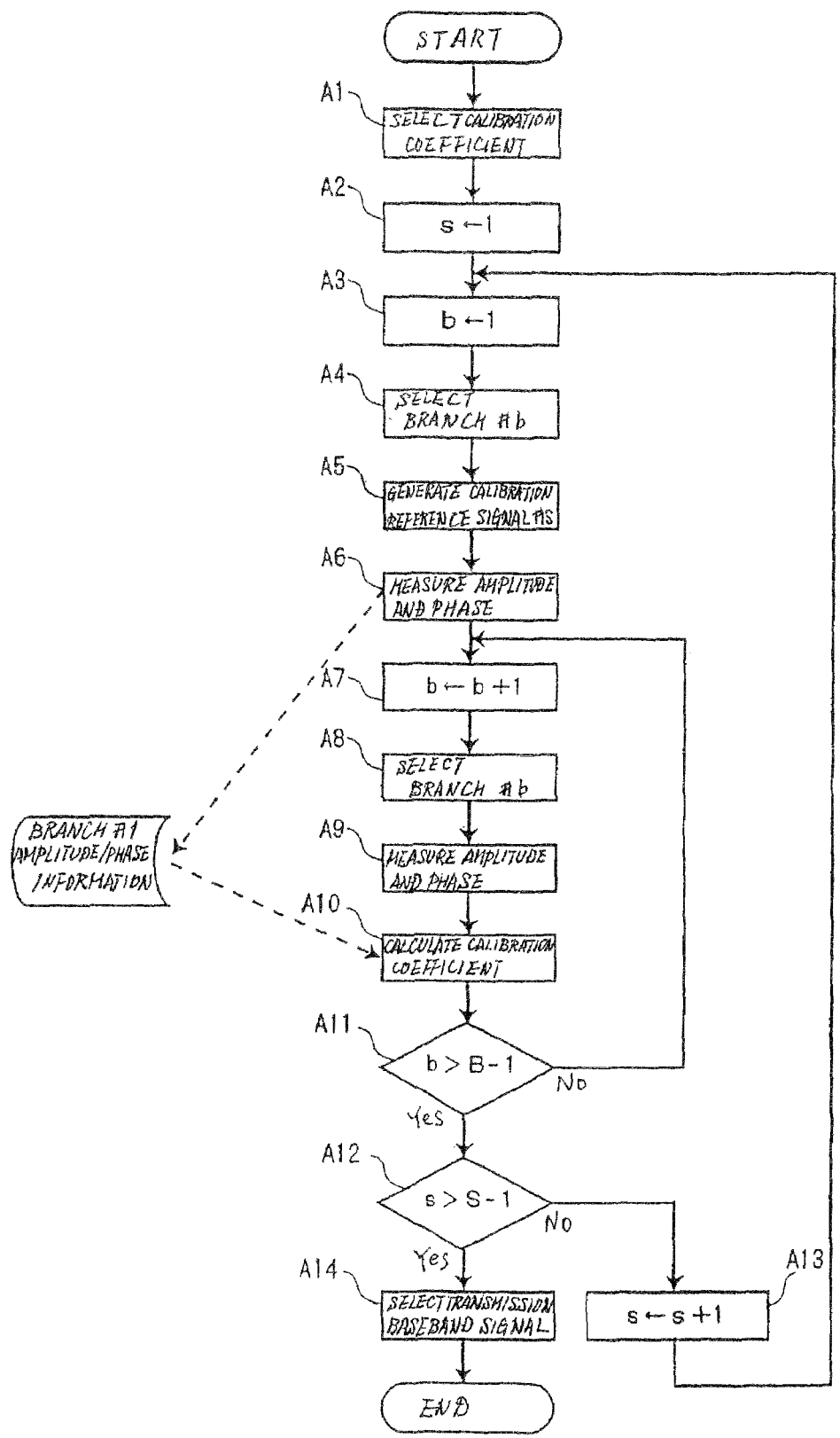
FIG. 6 is a flowchart of a process of calculating calibration coefficients of a radio transmitting apparatus shown in FIG. 3.
Figure 7:
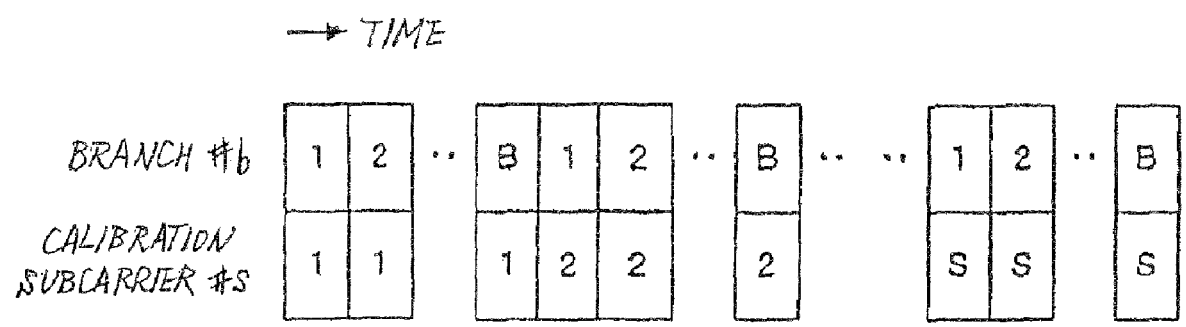
FIG. 7 is a diagram showing the manner in which variable b indicative of a branch number and variable s indicative of a subcarrier number to be calibrated change according to the process shown in FIG. 6.

FIG. 7 shows the manner in which variable b indicative of a branch number and variable s indicative of a subcarrier number to be calibrated change according to the process shown in FIG. 6.

The radio transmitting apparatus according to the first exemplary embodiment generates a signal used to measure a calibration coefficient corresponding to each subcarrier (a calibration reference signal), measures the amplitude and phase of a modulated signal, and calculates a calibration coefficient for each subcarrier. The radio transmitting apparatus according to the first exemplary embodiment can thus calculate a calibration coefficient based on a reduced amount of arithmetic operation as there is no need for fast Fourier transform. Therefore, the radio transmitting apparatus according to the first exemplary embodiment requires a reduced amount of arithmetic operation for calculating calibration coefficients, and thus an increase in the size of the hardware and an increase in power consumption can be avoided.

Since a calibration reference signal used for calibration is generated for each subcarrier, the period for calibration can be controlled for each subcarrier. Therefore, the calibration period can be flexibly controlled for reduced power consumption.

Second Exemplary Embodiment

A radio transmitting and receiving system according to a second exemplary embodiment of the present invention will be described below with reference to the drawings.

The radio transmitting and receiving system according to the second exemplary embodiment serves as a radio receiving apparatus (multicarrier receiving apparatus) having B antenna elements (B represents a positive number).

Figure 8:
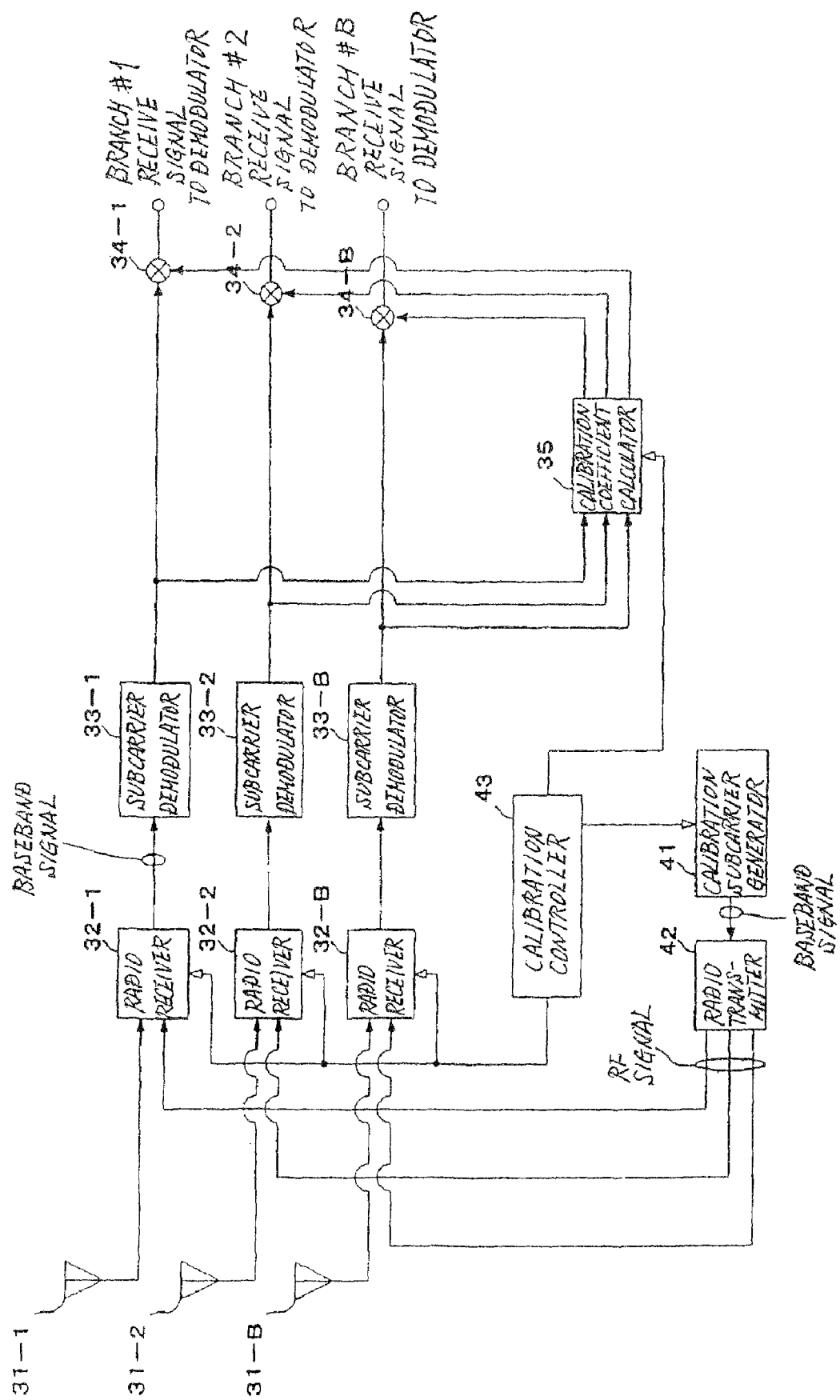
FIG. 8 is a block diagram of a radio transmitting and receiving system, which serves as a radio receiving apparatus, according to a second exemplary embodiment of the present invention.

As shown in FIG. 8, the radio receiving apparatus according to the second exemplary embodiment comprises antenna elements 31-1 through 31-B, radio receivers 32-1 through 32-B, subcarrier demodulators 33-1 through 33-B, calibration coefficient multipliers 34-1 through 34-B, calibration coefficient calculator 35, calibration subcarrier generator 41, radio transmitter 42, and calibration controller 43.

In a normal mode, radio receivers 32-1 through 32-B receive RF signals from antenna elements 31-1 through 31-B. In a calibration mode, radio receivers 32-1 through 32-B receive RF signals for calibration from radio transmitter 42. Radio receivers 32-1 through 32-B downconvert the RF signals received from antenna elements 31-1 through 31-B or radio transmitter 42 into baseband signals, convert the baseband signals from analog signals into digital signals, and output the digital baseband signals to subcarrier demodulators 33-1 through 33-B.

Subcarrier demodulators 33-1 through 33-B demodulate the baseband signals supplied from radio receivers 32-1 through 32-B into demodulated subcarrier signals, and output the demodulated subcarrier signals to calibration coefficient calculator 35 and calibration coefficient multipliers 34-1 through 34-B.

Calibration coefficient calculator 35 selects one of the B branches, determines a signal deviation between the branches by referring to output signals from subcarrier demodulators 33-1 through 33-B for the selected branch, and calculates a calibration coefficient from the signal deviation.

If it is assumed that the branch serving as a calibration reference is branch #1, and if an output signal (complex number) from subcarrier demodulator 33 for branch #b and subcarrier #s is expressed as $r_{b,s}$, then calibration coefficient calculator 35 determines calibration coefficient (complex number) $c_{b,s}$ for branch #b and subcarrier #s according to the following equation:

$$c_{b,s} = \frac{r_{1,s}}{r_{b,s}}$$

Calibration coefficient calculator 35 has a memory device which holds the calculated calibration coefficients. Calibration coefficient calculator 35 outputs the calculated calibration coefficients for the subcarriers always to calibration coefficient multipliers 34-1 through 34-B for all the branches.

Calibration coefficient multipliers 34-1 through 34-B multiply the demodulated subcarrier signals from subcarrier demodulators 33-1 through 33-B by the calibration coefficients supplied from calibration coefficient calculator 35, and output the multiplied results to reception signal demodulators, not shown. It is assumed that calibration coefficient multipliers 34-1 through 34-B are capable of multiplying the demodulated subcarrier signals by different calibration coefficients for the respective subcarriers.

In the calibration mode, calibration subcarrier generator 41 generates a frequency signal (modulation signal) of a subcarrier to be calibrated, and outputs the generated frequency signal to radio transmitter 42.

Radio transmitter 42 converts the modulation signal supplied from calibration subcarrier generator 41 from a digital signal into an analog signal, upconverts the signal into an RF signal, and outputs the RF signal to radio receivers 32-1 through 32-B.

Calibration controller 43 controls a calibrating operation of the radio receiving apparatus which is performed by radio receivers 32-1 through 32-B, calibration coefficient calculator 35, and calibration subcarrier generator 41. Calibration controller 43 may be implemented by a CPU which operates according to a program or an LSI circuit which comprises a combination of various logic circuits, for example.

Calibration coefficient multipliers 34-1 through 34-B shown in FIG. 8 will be described below with reference to FIG. 9.

Figure 9:
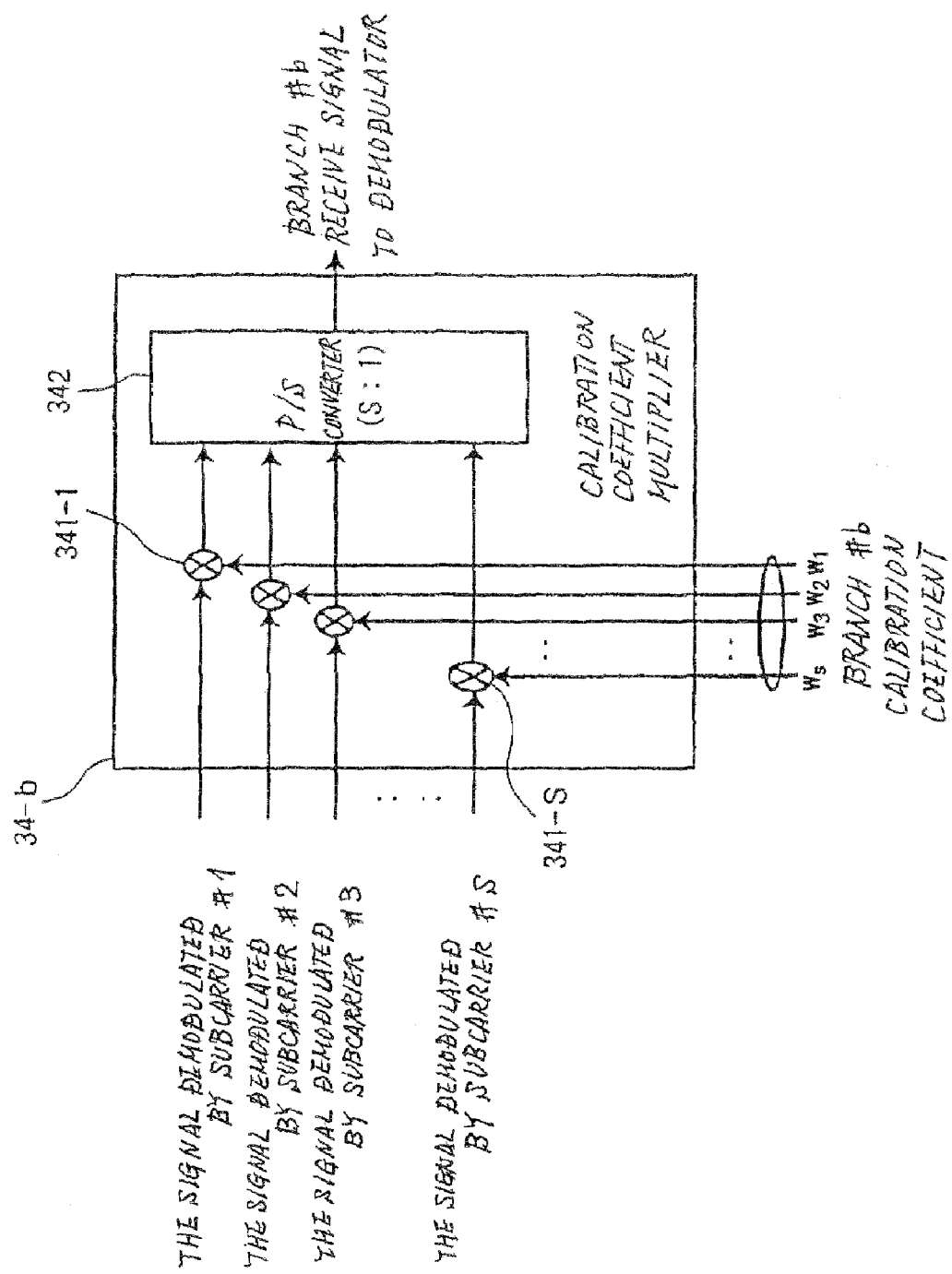
FIG. 9 is a block diagram of a calibration coefficient multiplier shown in FIG. 8.

FIG. 9 shows in block form an example of a calibration coefficient multiplier shown in FIG. 8.

As shown in FIG. 9, calibration coefficient multiplier 34 includes multipliers 341-1 through 341-S and parallel/serial (P/S) converter 342.

Multipliers 341-1 through 341-S multiply the demodulated subcarrier signals supplied from subcarrier demodulators 33-1 through 33-B by calibration coefficients supplied from calibration coefficient calculator 35, and outputs multiplied results to parallel/serial converter 342.

Parallel/serial converter 342 converts the parallel subcarrier signals supplied from multipliers 341-1 through 341-S into a serial signal, and outputs the serial signal to the corresponding reception signal demodulator for branch #b.

Calibration subcarrier generator 41 shown in FIG. 8 will be described below with reference to FIG. 10.

Figure 10:
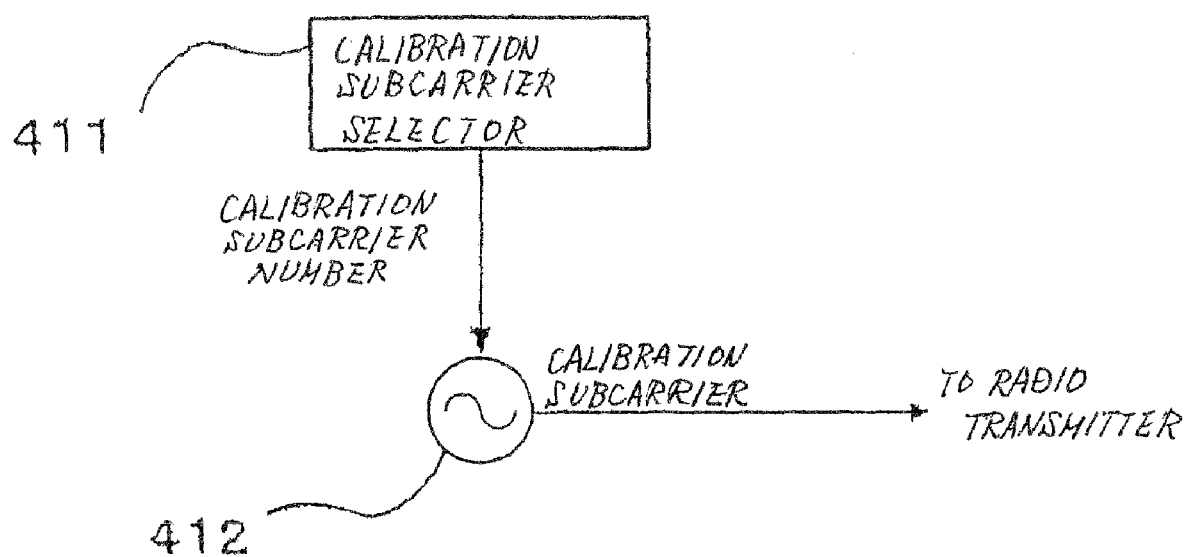
FIG. 10 is a block diagram of a calibration subcarrier generator shown in FIG. 8.

FIG. 10 shows in block form an example of calibration subcarrier generator 41 shown in FIG. 8.

As shown in FIG. 10, calibration subcarrier generator 41 includes calibration subcarrier selector 411 and oscillator 412.

Calibration subcarrier selector 411 outputs a subcarrier number, to be calibrated, to oscillator 412 according to an instruction from calibration controller 43. Calibration subcarrier selector 411 successively generates subcarrier numbers from #1 to #S, for example.

Oscillator 412 generates a sine-wave signal (modulation signal) having a frequency corresponding to the subcarrier number supplied from calibration subcarrier selector 411, and outputs the generated sine-wave signal to radio transmitter 42. According to the present exemplary embodiment, since a calibration process is carried out for each subcarrier, not all subcarrier frequency signals are generated at once, but only a frequency signal corresponding to a subcarrier number to be calibrated is generated. Therefore, an increase in the size of the circuit of the radio receiving apparatus can be avoided.

In the present exemplary embodiment, calibration coefficient multiplier 34 includes S multipliers 341-1 through 341-S corresponding to S subcarriers. However, calibration coefficient multiplier 34 may include only one multiplier 341 if data of S subcarriers are converted into a serial signal by time-division multiplexing. In other words, the number of multipliers 341 of calibration coefficient multiplier 34 included in the radio receiving apparatus according to the present exemplary embodiment is optional.

The radio receiving apparatus according to the second exemplary embodiment generates a frequency signal used to measure a calibration coefficient corresponding to each subcarrier (a modulation signal), and calculates a calibration coefficient for each subcarrier from a signal produced by demodulating the frequency signal. The radio receiving apparatus according to the second exemplary embodiment can thus calculate a calibration coefficient based on a reduced amount of arithmetic operation without it being necessary for inverse fast Fourier transform circuit to generate a modulation signal used to measure a calibration coefficient, unlike the radio receiving apparatus according to the related art. Therefore, the radio receiving apparatus according to the second exemplary embodiment requires a reduced amount of arithmetic operation for calculating calibration coefficients, and thus an increase in the size of the hardware and an increase in power consumption can be avoided.

Since a modulation signal used for calibration is generated for each subcarrier, the period for calibration can be controlled for each subcarrier. Therefore, the calibration period can flexibly be controlled for reduced power consumption.

In the above first and second exemplary embodiments, calibration coefficients are calculated successively from #1 to #S for calibration. However, the sequence of calibration processes is not limited to the order from #1 to #S, but may be optional.

Figure 11:
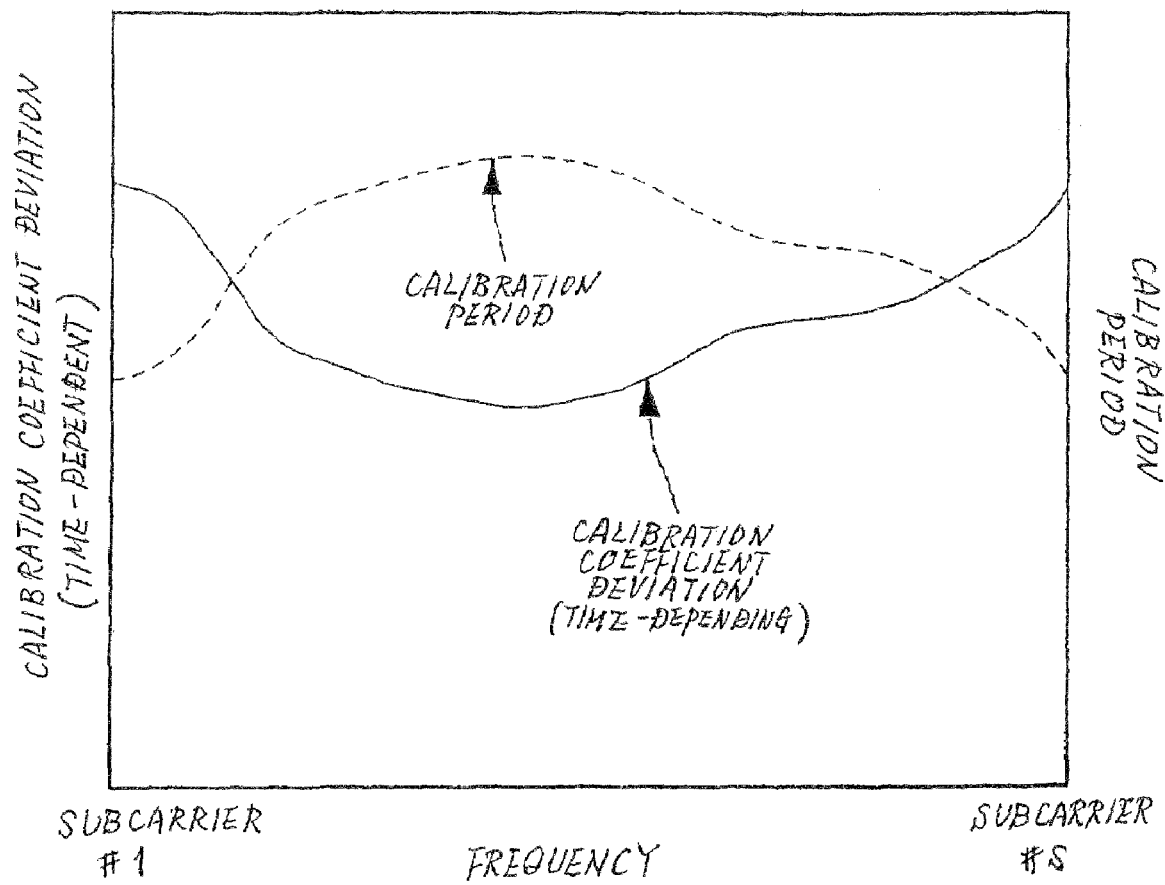
FIG. 11 is a graph showing an example in which the period of updating a calibration coefficient for each subcarrier is controlled.

In the above first and second exemplary embodiments, furthermore, calibration coefficients are determined only once. However, since the amplitude and phase characteristics of each branch vary due to temperature fluctuations and power supply voltage fluctuations, it is desirable to update calibration coefficients at appropriate times. If calibration coefficients are to be updated, they may be updated at periodic intervals which are not fixed, but are variable. For example, if the time-depending deviation between a pre-ceding calibration coefficient and a present calibration coefficient is large, then the calibration coefficient for the corresponding subcarrier may be updated at a reduced periodic interval, and if the time-depending deviation is small, then the calibration coefficient for the corresponding subcarrier may be updated at an increased periodic interval. According to such an updating scheme, since the periodic interval for determining a calibration coefficient may be increased with respect to a subcarrier whose time-dependent calibration coefficient variation is small, the calibration coefficient can be determined efficiently. FIG. 11 is a graph showing an example in which the period of updating a calibration coefficient for each subcarrier is controlled.

Figure 12:
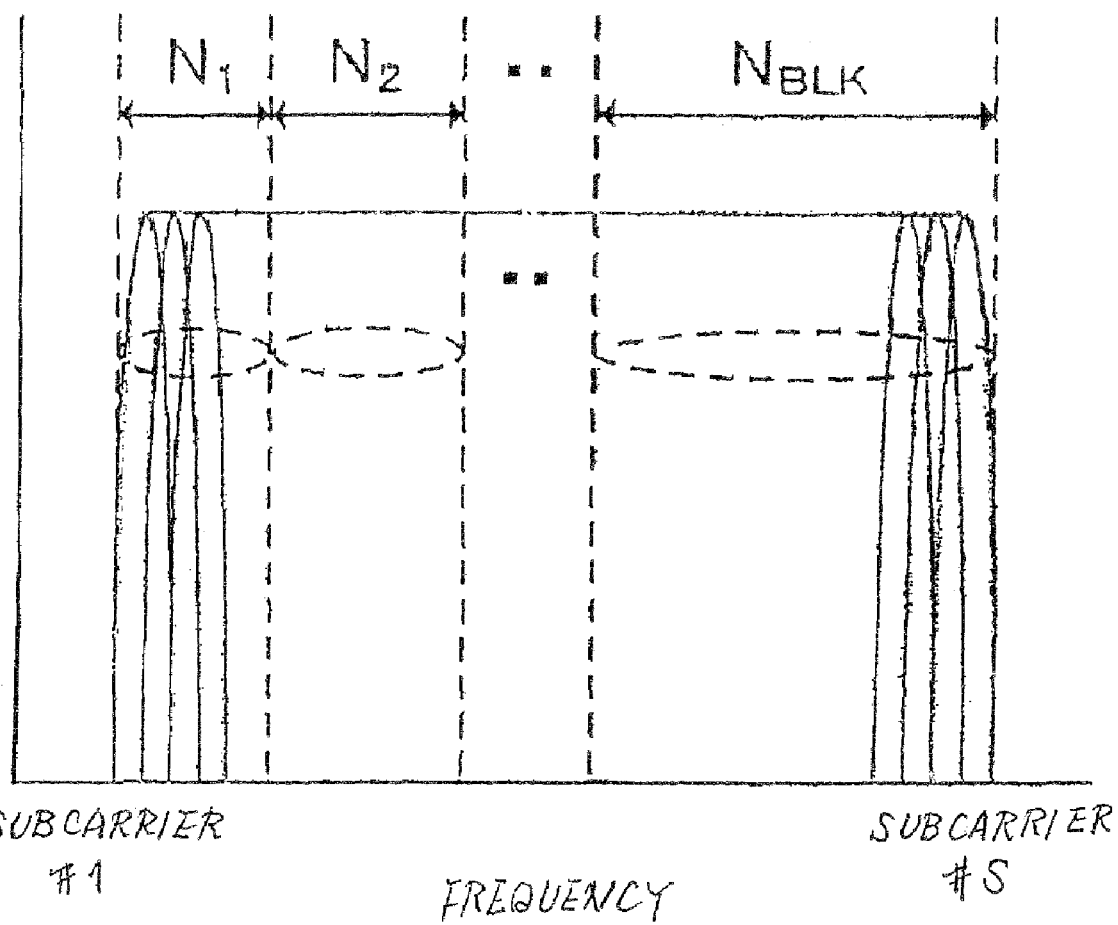
FIG. 12 is a diagram showing an example in which a plurality of subcarriers are divided into blocks.

In the above first and second exemplary embodiments, moreover, S calibration coefficients are determined in association with respective S sub-carriers, and a calibration process is performed for each subcarrier. However, S subcarriers may be divided into BLK blocks (BLK represents a positive number smaller than S), and a calibration coefficient may be determined for each of the blocks. According to such a calibration coefficient determining scheme, $N_{blk}$ subcarriers (blk=1, 2, . . . , BLK) in a block may be multiplied by a common calibration coefficient $W_{blk}$. FIG. 12 shows an example in which S subcarriers are divided into BLK blocks.

As described above, the size of the hardware and the power consumption of the radio transmitting and receiving system, according to the present invention, are reduced by controlling the periodic interval for updating calibration coefficients and by determining a calibration coefficient for each block.

Embodiment

An embodiment of a radio transmitting and receiving system according to the present invention will be described below.

According to the present embodiment, a subcarrier modulator includes three branches for performing inverse fast Fourier transform (IFFT) in the operation of the radio transmitting apparatus according to the first exemplary embodiment.

Figure 13:
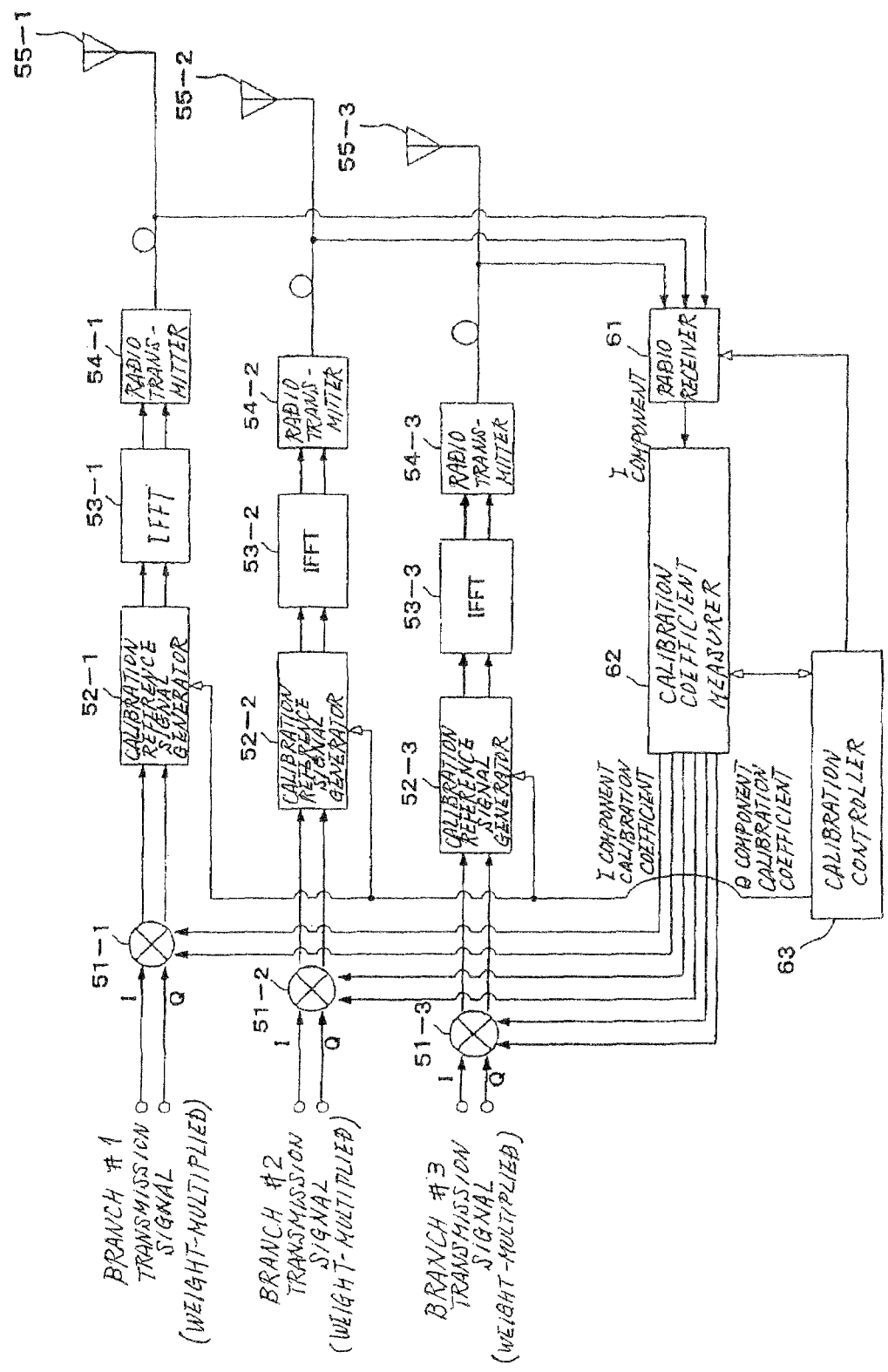
FIG. 13 is a block diagram of an embodiment of the radio transmitting apparatus shown in FIG. 3.

As shown in FIG. 13, the radio transmitting apparatus according to the present embodiment comprises calibration coefficient multipliers 51-1 through 51-3, calibration reference signal generators 52-1 through 52-3, IFFT processors 53-1 through 53-3, radio transmitters 54-1 through 54-3, antenna elements 55-1 through 55-3, radio receiver 61, calibration coefficient measurer 62, and calibration controller 63.

Calibration coefficient multipliers 51-1 through 51-3 complex-multiply I components and Q components of transmission baseband signals from branches #1 through #3 which have been modulated and multiplied by weights, by I components and Q components of calibration coefficients supplied from calibration coefficient measurer 62, and output multiplied results (transmission baseband signals) to calibration reference signal generators 52-1 through 52-3.

In a normal mode, calibration reference signal generators 52-1 through 52-3 output the weight-multiplied transmission baseband signals supplied from calibration coefficient multipliers 51-1 through 51-3 to IFFT processors 53-1 through 53-3. In a calibration mode, calibration reference signal generators 52-1 through 52-3 output calibration reference signals (I, Q)=(1, 0) to IFFT processors 53-1 through 53-3 which correspond to a subcarrier to be calibrated, and output calibration reference signals (I, Q)=(0, 0) to other IFFT processors 53-1 through 53-3.

IFFT processors 53-1 through 53-3 perform an IFFT process of 1024 points, for example, on the signals supplied from calibration reference signal generators 52-1 through 52-3, and output IFFT-processed signals to radio transmitters 54-1 through 54-3. It is assumed in the description which follows that the number of subcarriers is 512.

Radio transmitters 54-1 through 54-3 convert the baseband signals supplied from IFFT processors 53-1 through 53-3 from digital signals into analog signals, upconvert the analog signals into RF signals, and output the RF signals to antenna elements 55-1 through 55-3 and to radio receiver 61.

Radio receiver 61 selectively receives an RF signal supplied to one antenna element from among antenna elements 55-1 through 55-3, downconverts the selected RF signal into a baseband signal, converts the baseband signal from an analog signal into a digital signal, and outputs the I component (or the Q component) of the digital signal to calibration coefficient measurer 62.

Calibration coefficient measurer 62 measures the amplitude and phase of the I component (or the Q component) of the reference signal output from radio receiver 61, determines amplitude deviations and phase deviations between the branches from the measured values, and calculates calibration coefficients based on the amplitude deviations and the phase deviations. Calibration coefficient measurer 62 has a memory device which stores the calculated calibration coefficients. Calibration coefficient measurer 62 outputs the calculated calibration coefficients for the respective subcarriers always to calibration coefficient multipliers 51-1 through 51-3 for all the branches.

Calibration controller 63 controls a calibrating operation of the radio transmitting apparatus which is performed by calibration reference signal generators 52-1 through 52-3, calibration coefficient measurer 62, and radio receiver 61. Calibration controller 63 may be implemented by a CPU which operates according to a program or an LSI circuit which comprises a combination of various logic circuits, for example.

Calibration coefficient measurer 62 shown in FIG. 13 will be described below with reference to FIG. 14.

Figure 14:
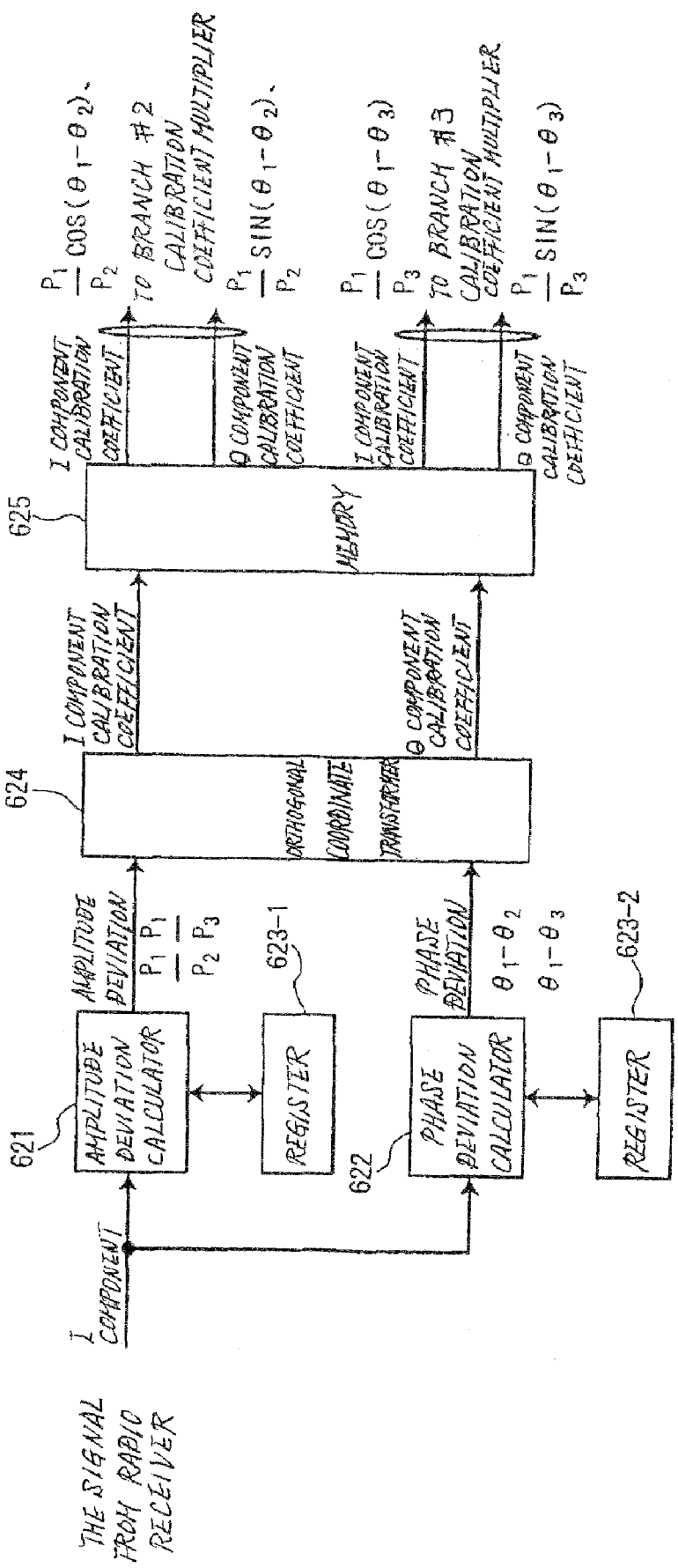
FIG. 14 is a block diagram of a calibration coefficient measurer shown in FIG. 13.

FIG. 14 shows in block form an example of calibration coefficient measurer 62 shown in FIG. 13.

As shown in FIG. 14, calibration coefficient measurer 62 comprises amplitude deviation calculator 621, phase deviation calculator 622, registers 623-1, 623-2, orthogonal coordinate transformer 624, and memory 625.

Amplitude deviation calculator 621 determines an amplitude deviation between branches of the reference signal (the I component) supplied from radio receiver 61, and outputs the determined amplitude deviation to orthogonal coordinate transformer 624. Register 623-1 holds the data (the measured value of the amplitude of the I component) output from amplitude deviation calculator 621, and outputs the stored data to amplitude deviation calculator 621 at a predetermined time.

Phase deviation calculator 622 determines the phase deviation between branches of the I component supplied from radio receiver 61, and outputs the determined phase deviation to orthogonal coordinate transformer 624. Register 623-2 stores the data (the measured value of the phase of the I component) output from phase deviation calculator 622, and outputs the stored data to phase deviation calculator 622 at a predetermined time.

Orthogonal coordinate transformer 624 performs an orthogonal coordinate transform based on the amplitude deviation supplied from amplitude deviation calculator 621 and the phase deviation supplied from phase deviation calculator 622, and outputs the I and Q components of a calibration coefficient to memory 625.

Memory 625 stores the calibration coefficient supplied from orthogonal coordinate transformer 624, and outputs the stored calibration coefficient to calibration coefficient multipliers associated with those branches other than the reference antenna element. For example, if branch #1 is used as a reference antenna element, then memory 625 outputs the stored calibration coefficient to calibration coefficient multipliers 51-2, 51-3 associated with branches #2, #3. At this time, calibration coefficient measurer 62 outputs a calibration coefficient whose I component is 1 and whose Q component is 0 to calibration coefficient multiplier 51-1 associated with branch #1.

Operation of the radio transmitting apparatus according to the present embodiment for determining calibration coefficients of subcarriers for branch #2, while branch #1 is used as a reference antenna element, will be described below.

Calibration controller 63 controls amplitude deviation calculator 621 to measure maximum amplitude value $P_1$ of the I component of branch #1 supplied from radio receiver 61. Measured maximum amplitude value $P_1$ is held by register 623-1.

Then, calibration controller 63 controls amplitude deviation calculator 621 to measure maximum amplitude value $P_2$ of the I component of branch #2, to read maximum amplitude value $P_1$ from register 623-1, and to determine amplitude deviation $P_1/P_2$.

Figure 15:
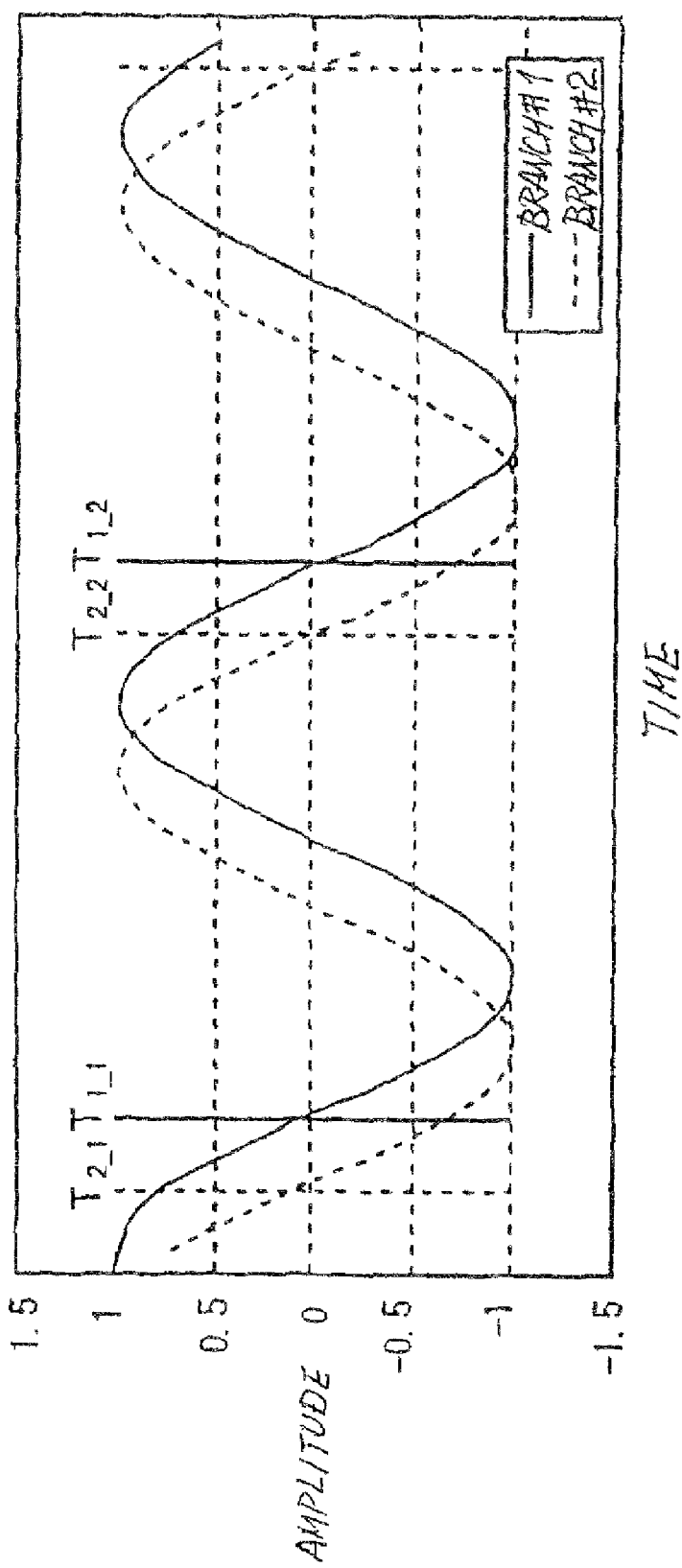
FIG. 15 is a graph showing an example in which a phase deviation is determined by the calibration coefficient measurer shown in FIG. 13.

Next, calibration controller 63 controls phase deviation calculator 622 to determine a phase deviation between branches #1, #2 supplied from radio receiver 61. A phase deviation may be determined by a process for detecting a polarity inversion of a calibration subcarrier as shown in FIG. 15, for example. FIG. 15 shows an example in which the phase deviation between branch #1 and branch #2 is determined by detecting times at which the polarity of a received calibration subcarrier signal of branch #1 and the polarity of a received calibration subcarrier signal of branch #2 are inverted.

Specifically, polarity inversion times $T_{11}$, $T_{12}$ of an I component of branch #1 input from radio receiver 61 are measured and saved in register 623-2. Then, polarity inversion times $T_{21}$, $T_{22}$ of an I component of branch #2 are measured. At this time, a phase deviation $\theta_1-\theta_2$ of branch #2 with respect to branch #1 can be determined as $(T_{11}-T_{21})/(T_{12}-T_{11}) \times 360°$.

Orthogonal coordinate transformer 624 performs an orthogonal coordinate transform based on amplitude deviation $P_1/P_2$ output from amplitude deviation calculator 621 and phase deviation $\theta_1-\theta_2$ output from phase deviation calculator 622, determines I component $P_1/P_2 \cos(\theta_1-\theta_2)$ and Q component $P_1/P_2 \sin(\theta_1-\theta_2)$ of a calibration coefficient, and stores them in memory 625.

The operation for determining calibration coefficients for branch #2 has been described above. Calibration coefficients for branch #3 can also be determined according to the same process as with branch #2.

Memory 625 stores the calibration coefficient output from orthogonal coordinate transformer 624. The calibration coefficients stored by memory 625 are read by calibration coefficient multipliers 51-2, 51-3. When data modulated by subcarriers are time-division-multiplexed for the respective subcarriers and supplied to calibration coefficient multipliers 51-2, 51-3, calibration coefficients that have been time-division-multiplexed based on the modulated data are read from memory 625.

Figure 16:
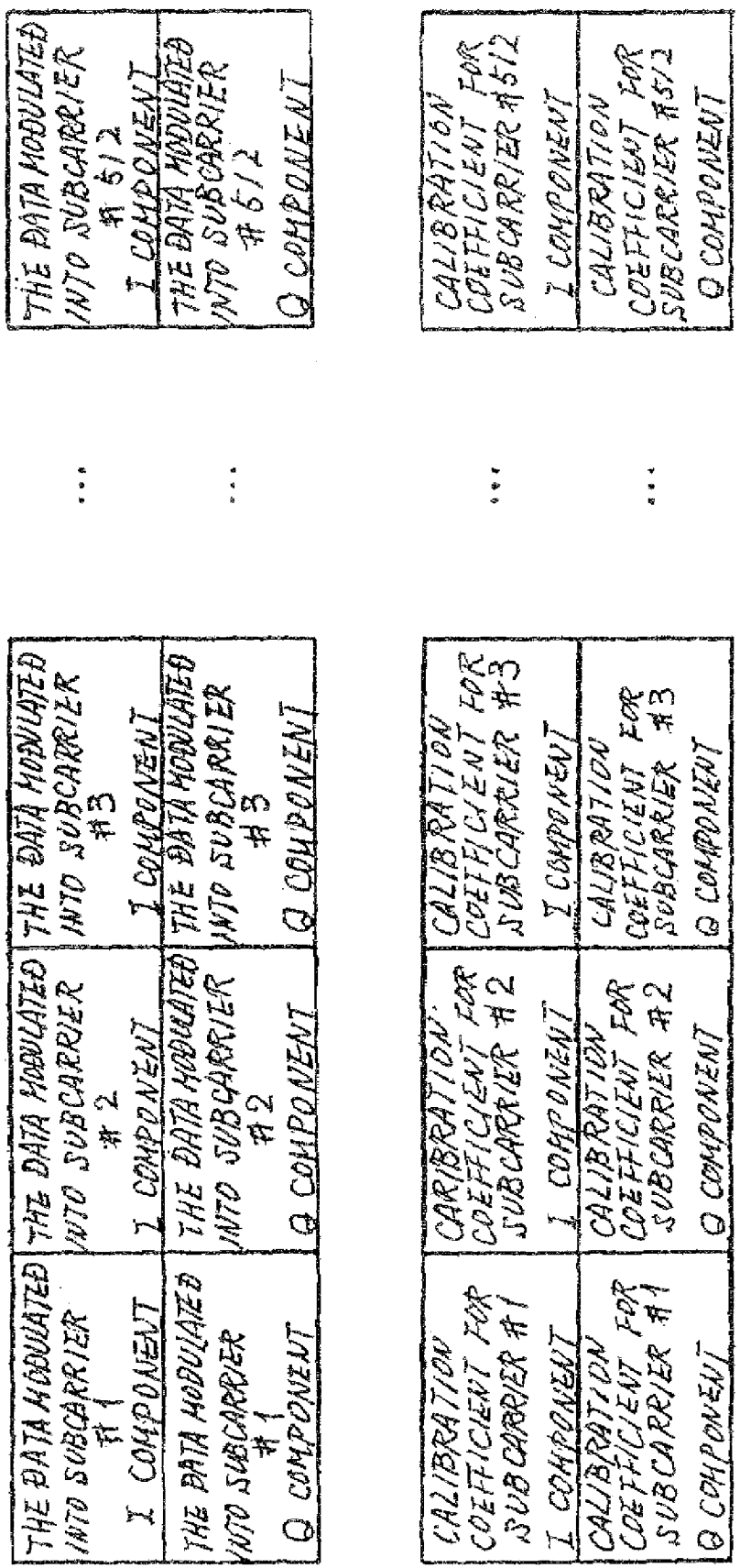
FIG. 16 is a diagram showing the timing for outputting subcarrier-modulated data and calibration coefficients to calibration coefficient multipliers shown in FIG. 13.

FIG. 16 shows the timing for outputting subcarrier-modulated data and calibration coefficients to calibration coefficient multipliers 51-2, 51-3.

The amount of arithmetic operation required to determine a calibration coefficient for one subcarrier will be described below.

In the present embodiment, the process for determining a calibration coefficient from an amplitude deviation and a phase deviation has been described above. According to another process, a reference signal may be processed for each subcarrier according to discrete Fourier transform (DFT) to measure the amplitude and phase of a transmission signal for each branch, and a calibration coefficient may be determined from the measured amplitude and phase values.

Figure 17:
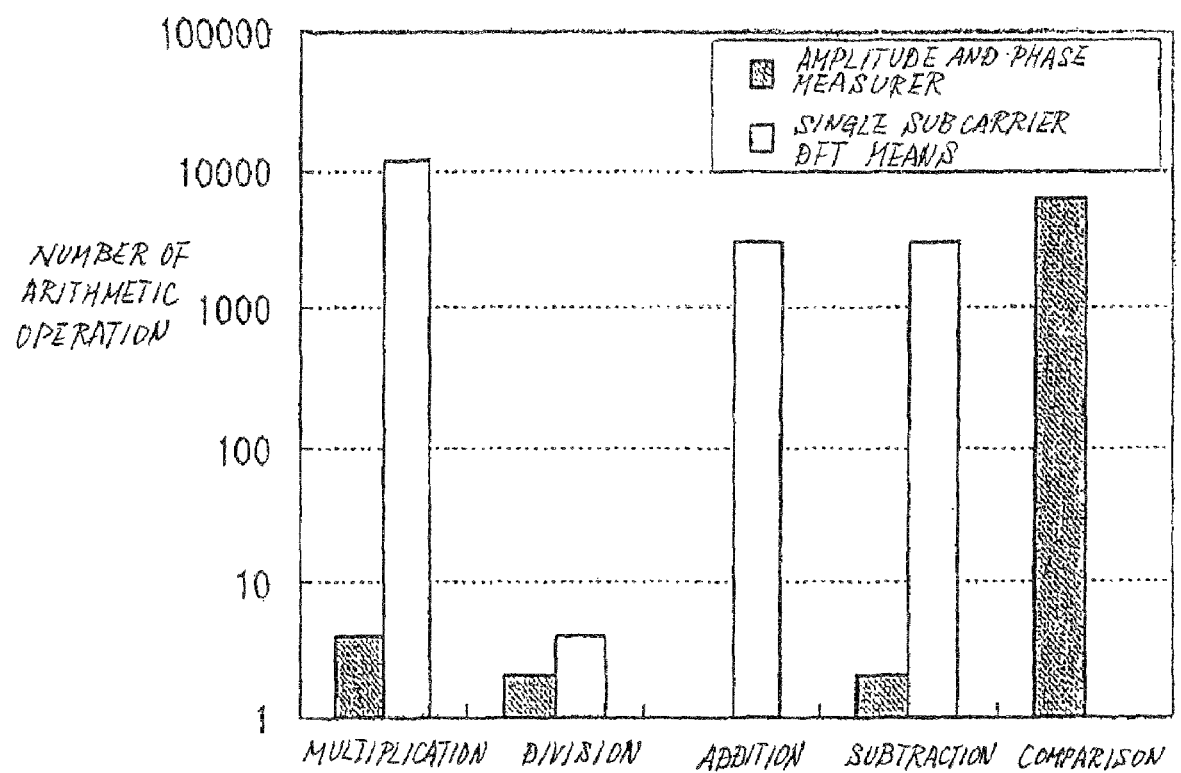
FIG. 17 is a graph showing the amounts of arithmetic operation required by a process for determining a calibration coefficient from an amplitude deviation and a phase deviation and a process for determining a calibration coefficient by performing discrete Fourier transform for each subcarrier.

FIG. 17 shows, for comparison, the amounts of arithmetic operation required by these two processes. The number of points of discrete Fourier transform is 1024, and five items, i.e., multiplication, division, addition, subtraction, and comparison, are analyzed for comparing the amounts of arithmetic operation.

It can be seen from FIG. 17 that when DFT is used to calculate a calibration coefficient, the number of multiplications and the number of additions are large because the number of complex multiplications is large, and when an amplitude deviation and a phase deviation are used to calculate a calibration coefficient, the amount of arithmetic operation is greatly reduced though the number of comparisons is large.

The radio transmitting and receiving system of the related art performs subcarrier demodulation using N-point FFT for each plurality of subcarriers. The amount of arithmetic operations and the required size of the circuits for performing subcarrier demodulation for each plurality of (N) subcarriers and performing subcarrier demodulation for each subcarrier will be described below.

(1) Using N-Point FFT:

When N-point FFT is used, the amount of arithmetic operations and the required size of the circuits for performing subcarrier demodulation for each subcarrier and for performing subcarrier demodulation for each set of N sub-carriers are the same as each other. In other words, the same arithmetic operation is used for performing subcarrier demodulation for each subcarrier and for performing subcarrier demodulation for each set of N subcarriers.

(2) Using One-Subcarrier DFT (N Points):

When one-subcarrier DFT (N points) is used, the amount of arithmetic operations for performing subcarrier demodulation for each subcarrier and for performing subcarrier demodulation for each set of N subcarriers are different from each other. For performing subcarrier demodulation for each subcarrier, subcarrier demodulation for each subcarrier is performed once. For performing subcarrier demodulation for each set of N subcarriers, sub-carrier demodulation for each subcarrier is performed N times.

Therefore, if the number of subcarriers for subcarrier demodulation is small (N points >>the number of subcarriers for subcarrier demodulation), then the amount of arithmetic operations is smaller for one-subcarrier DFT than for N-point FFT. However, if the number of subcarriers for subcarrier demodulation is large, then the amount of arithmetic operations may be greater for one-subcarrier DFT than for N-point FFT.

If the number of subcarriers for subcarrier demodulation is small (N points >>the number of subcarriers for subcarrier demodulation), then the circuit scale is smaller for one-subcarrier DFT than for N-point FFT. However, if the number of subcarriers for subcarrier demodulation is large, then the circuit scale can be smaller for one-subcarrier DFT than for N-point FFT because only one circuit is needed for performing subcarrier demodulation for each subcarrier irrespective of the number of subcarriers for subcarrier demodulation though the processing time is longer.

A calibrating process of the radio transmitting apparatus according to the present embodiment will be described below. Three operational examples will be described below. In each of these operational examples, the amplitude characteristics and the phase characteristics of a branch to be calibrated are equalized to the amplitude characteristics and the phase characteristics of a reference branch.

It is assumed that in the operational examples to be described below a process for determining a calibration coefficient and a calibrating process (a process for outputting a calibration reference signal) are carried out with the same timing.

The operational examples of the radio transmitting apparatus to be described below are also applicable to the radio receiving apparatus according to the second exemplary embodiment. In the first through third operational examples, as applied to the radio receiving apparatus, "transmission data" may be replaced with "reception data", calibration controller 63 with calibration controller 43 of the radio receiving apparatus, and an operation for outputting a calibration reference signal to perform calibration with an operation for generating a frequency signal for a subcarrier to be calibrated.

First Operational Example

According to the first operational example, a period for performing calibration (hereinafter referred to as "calibration period") is set to a fixed value, and subcarriers #1 through #S are calibrated in the order named.

The first operational example will be described below with reference to a flowchart shown in FIG. 18.

Figure 18:
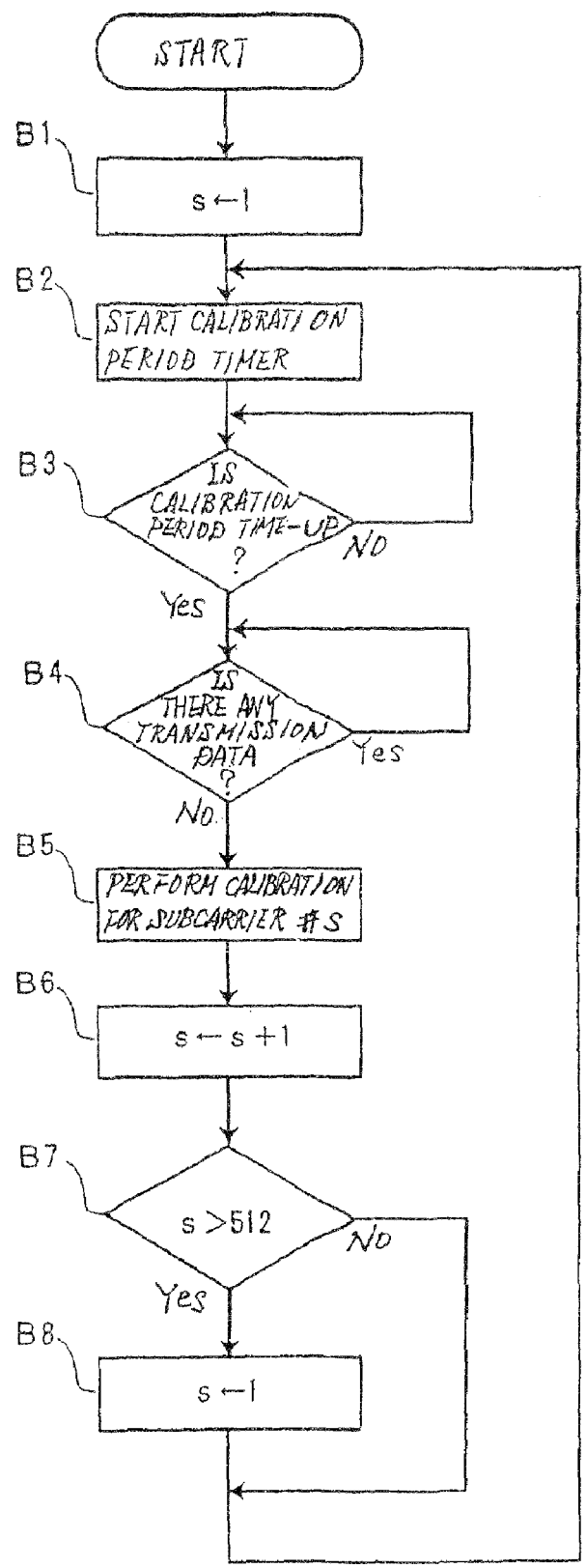
FIG. 18 is a flowchart of a processing sequence of a first operational example of a calibration process of the radio transmitting and receiving system according to the present invention.

As shown in FIG. 18, calibration controller 63 substitutes "1" in variable s in step B1, and starts to operate a calibration period timer thereof in step B2.

Then, calibration controller 63 judges whether the time measured by the calibration period timer is up or not in step B3. If the time measured by the calibration period timer is not up, then the decision process in step B3 is repeated.

If the time measured by the calibration period timer is up, then calibration controller 63 judges whether there is transmission data or not in step B4. If there is transmission data, then calibration controller 63 repeats the decision process in step B4. If there is no transmission data, then calibration controller 63 calculates a calibration coefficient for subcarrier #s, and outputs the calculated calibration coefficient to perform calibration in step B5.

Then, calibration controller 63 adds "1" to variable s in step B6, and then judges whether the calibration of all subcarriers is finished or not in step B7. Specifically, calibration controller 63 judges whether the value of variable s is greater than 512 or not. If the value of variable s is not greater than 512, then control goes back to step B2 to repeat the processing in steps B2 through B7. If the value of variable s is greater than 512, then calibration controller 63 substitutes "1" in variable s in step B8, and control goes back to step B2 to repeat the processing in steps B2 through B8.

Figure 19:
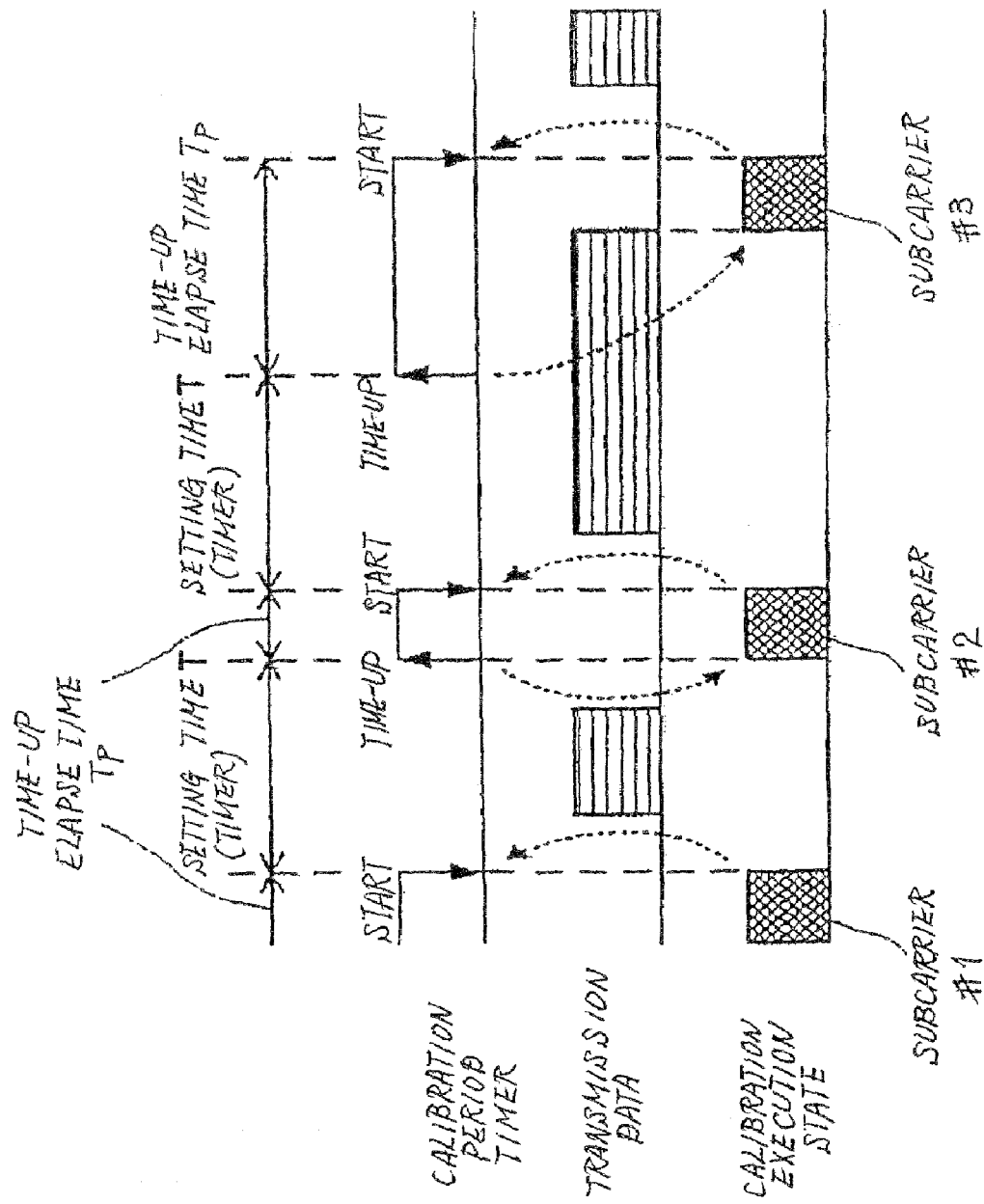
FIG. 19 is a timing chart of a calibration period timer, transmission data, and a calibration execution state in the first operational example shown in FIG. 18.

FIG. 19 shows a timing chart of the first operational example.

The timing chart of FIG. 19 illustrates an example in which subcarriers #1 through #512 are calibrated successively in the order named, and shows a calibration period timer, transmission data, and a calibration execution state.

Subcarriers are calibrated when time T set in the calibration period timer has elapsed and there is no transmission data. If there is transmission data when time T set in the calibration period timer has elapsed, the calibration controller performs no calibration, but waits, and if there is no transmission data, the calibration controller performs calibration.

FIG. 20 shows an example of transition states of the radio transmitting and receiving system according to the present invention.

As shown in FIG. 20, the state of the radio transmitting and receiving system is generally divided into three states, i.e., data transmission state 71 in which data is being transmitted, calibration state 72 in which calibration is being carried out, and wait state 73 in which transmission of data and calibration are not being carried out. The radio transmitting apparatus according to the present operational example can transit between data transmission state 71, calibration state 72, and wait state 73.

Second Operational Example

According to the second operational example, a calibration period is changed for each subcarrier.

The second operational example will be described below with reference to a flowchart shown in FIG. 21. In particular, the second operational example will be described below with respect to subcarrier #3.

Figure 21:
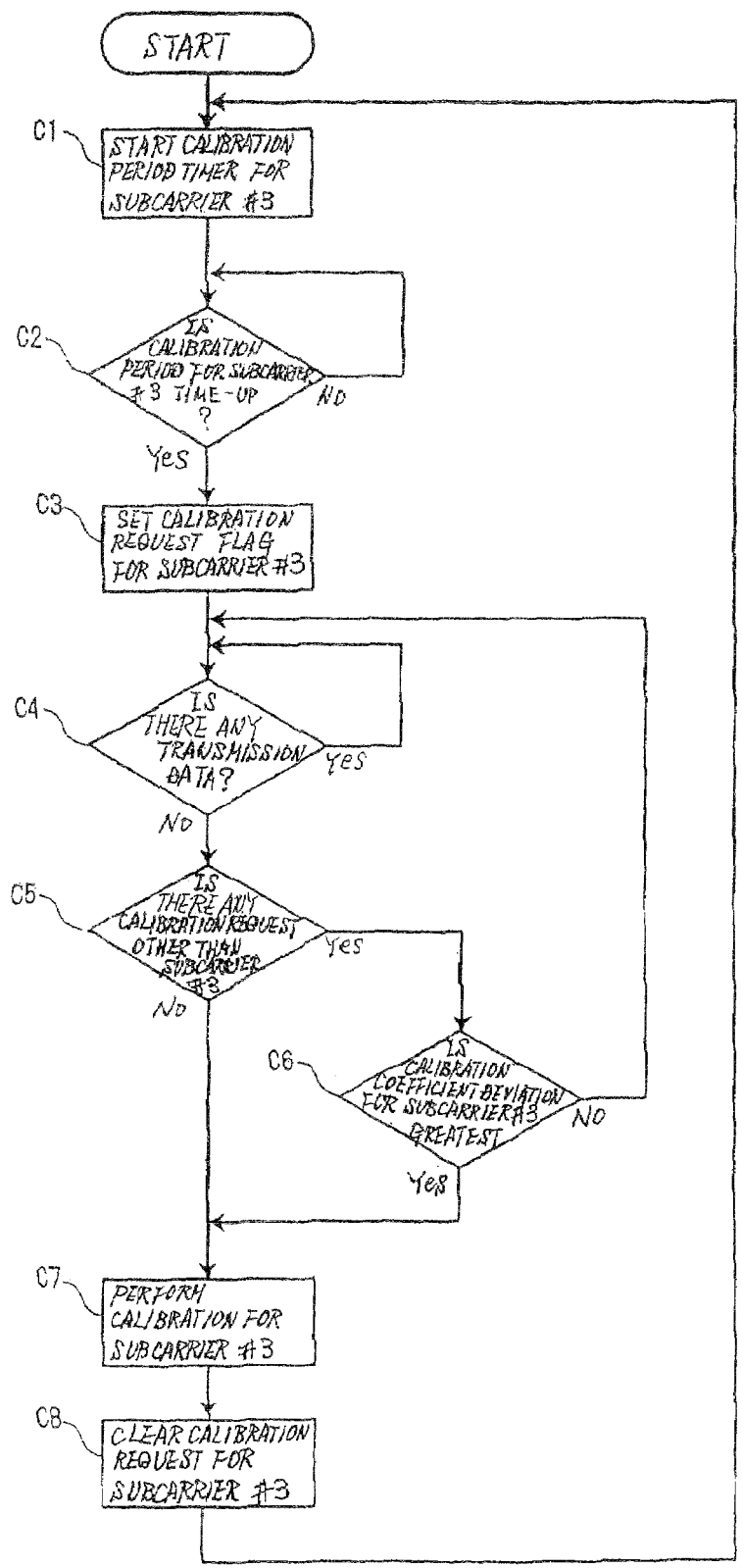
FIG. 21 is a flowchart of a processing sequence of a second operational example of a calibration process of the radio transmitting and receiving system according to the present invention.

As shown in FIG. 21, calibration controller 63 starts a calibration period timer for subcarrier #3 in step C1.

Then, calibration controller 63 judges whether the time measured by the calibration period timer for subcarrier #3 is up or not in step C2. If the time measured by the calibration period timer for subcarrier #3 is not up, then calibration controller 63 executes step C2 again. If the time measured by the calibration period timer for subcarrier #3 is up, then calibration controller 63 sets a calibration request flag for subcarrier #3 in step C3.

Then, calibration controller 63 judges whether there is transmission data or not in step C4. If there is transmission data, then calibration controller 63 repeats the decision process in step C4. If there is no transmission data, then calibration controller 63 judges whether there is or is not a calibration request for subcarriers, other than for subcarrier #3, in step C5. If there is a calibration request for subcarriers, other than subcarrier #3, then calibration controller 63 judges in step C6 whether the deviation of the calibration coefficient for subcarrier #3, due to the elapse of time, is the greatest or not. If the deviation of the calibration coefficient for subcarrier #3 is the greatest, then control goes to step C7. If the deviation of the calibration coefficient for subcarrier #3 is not the greatest, then control goes back to step C4 to repeat the processing in steps C4 through C6.

If there is no calibration request for subcarriers other than subcarrier #3 in step C5 or if the deviation of the calibration coefficient for subcarrier #3 is the greatest, then calibration controller 63 outputs a calibration reference signal for subcarrier #3, and calculates a calibration coefficient to perform calibration in step C7.

Finally, calibration controller 63 clears the calibration request flag for subcarrier #3 in step C8. Control then goes back to step C1 to repeat the processing in steps C1 through C8.

Figure 22:
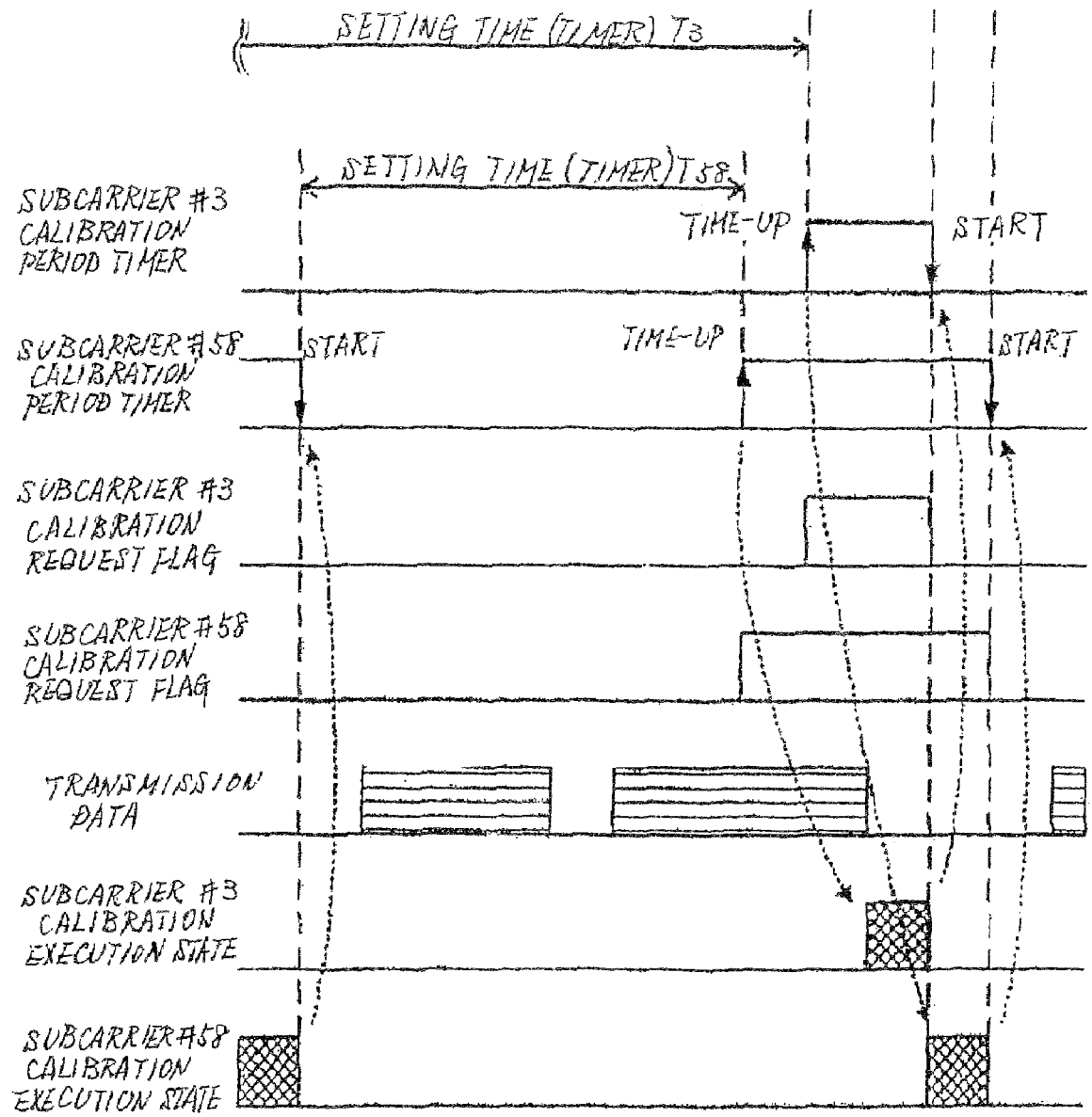
FIG. 22 is a timing chart of a calibration period timer, transmission data, and a calibration execution state in the second operational example shown in FIG. 21.

FIG. 22 shows a timing chart of the second operational example.

The timing chart of FIG. 22 illustrates an example in which subcarrier #3 and subcarrier #58 are calibrated, and shows a calibration period timer for subcarrier #3, a calibration period timer for subcarrier #58, a calibration request flag for subcarrier #3, a calibration request flag for subcarrier #58, transmission data, a calibration execution state for subcarrier #3, and a calibration execution state for subcarrier #58.

In the description which follows, the time set in the calibration period timer for subcarrier #3 is represented by $T_3$, and the time set in the calibration period timer for subcarrier #58 by $T_{58}$.

When the time measured by the calibration period timer for a subcarrier is up, calibration controller 63 sets the calibration request flag for the subcarrier. When the calibration of the subcarrier is completed, calibration controller 63 clears the calibration request flag.

When the time measured by the calibration period timer for a subcarrier to be calibrated is up and there is no transmission data, if calibration request flags for other subcarriers are set, then calibration controller 63 preferentially calibrates a subcarrier whose calibration coefficient deviation is greatest due to the elapse of time, from among all the subcarriers whose calibration request flags are to be set. Therefore, even in the event that there are calibration requests for two or more subcarriers, the subcarrier whose calibration coefficient deviation is the greatest can be preferentially calibrated.

In the example shown in FIG. 22, the calibration coefficient deviation of subcarrier #3 is greater than the calibration coefficient deviation of subcarrier #58. In this case, the calibration period of subcarrier #3 whose calibration coefficient deviation is greater may be reduced by changing the times $T_3$, $T_{58}$ set in the calibration period timers.

FIG. 23 shows an example of a setting time determining table for the calibration period timer for subcarrier #3.

According to the setting time determining table shown in FIG. 23, if the calibration coefficient deviation is greater, then time $T_3$ set in the calibration period timer is shorter, and if the calibration coefficient deviation is smaller, time $T_3$ set in the calibration period timer is longer. The setting time determining table allows a subcarrier whose calibration coefficient deviation, due to the elapse of time is greater, to be preferentially calibrated. Accordingly, the calibrating process is carried out in a manner to clearly reflect variations in the amplitude characteristics and the phase characteristics of each branch.

Third Operational Example

According to the third operational example, a calibration period is changed for each subcarrier.

The third operational example will be described below with reference to a flowchart shown in FIG. 24. In particular, the third operational example will be described below with respect to subcarrier #3.

Figure 24:
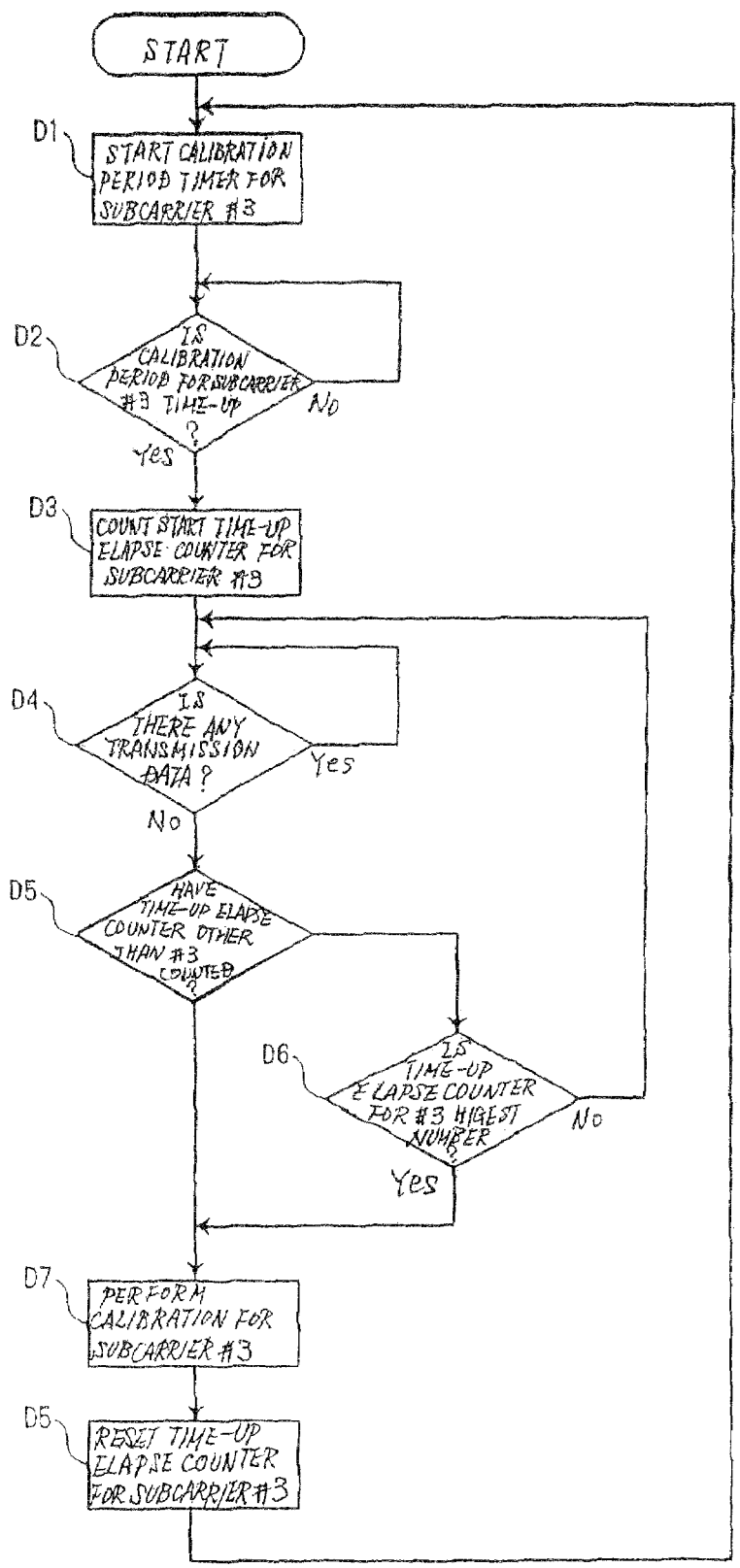
FIG. 24 is a flowchart of a processing sequence of a third operational example of a calibration process of the radio transmitting and receiving system according to the present invention.

As shown in FIG. 24, calibration controller 63 starts a calibration period timer for subcarrier #3 in step D1.

Then, calibration controller 63 judges whether the time measured by the calibration period timer for subcarrier #3 is up or not in step D2. If the time measured by the calibration period timer for subcarrier #3 is not up, then calibration controller 63 repeats the processing in step D2. If the time measured by the calibration period timer for subcarrier #3 is up, then calibration controller 63 starts a time-up elapse counter for subcarrier #3 in step D3.

Then, calibration controller 63 judges whether there is transmission data or not in step D4. If there is transmission data, then calibration controller 63 repeats the decision process in step D4. If there is no transmission data, then calibration controller 63 judges whether the number of time-up elapse counters for subcarriers other than subcarrier #3 has been counted or not in step D5.

If the time-up elapse counters for subcarriers other than subcarrier #3 have been counted, then calibration controller 63 judges whether the number of time-up elapse counter for subcarrier #3 is the highest number or not in step D6. If the number of time-up elapse counter for subcarrier #3 is not the highest number, then control goes back to step D4 to repeat the processing in step D4 through D6. If the number of time-up elapse counter for subcarrier #3 is the highest, then control goes to step D7.

If the time-up elapse counters for subcarriers other than subcarrier #3 have not been counted in step D5, or the number of time-up elapse counter for subcarrier #3 is the highest in step D6, then calibration controller 63 outputs a calibration reference signal for subcarrier #3, and performs calibration in step D7.

Finally, calibration controller 63 resets the time-up elapse counter for subcarrier #3 in step D8. Control then goes back to step D1 to repeat the processing in steps D1 through D8.

Figure 25:
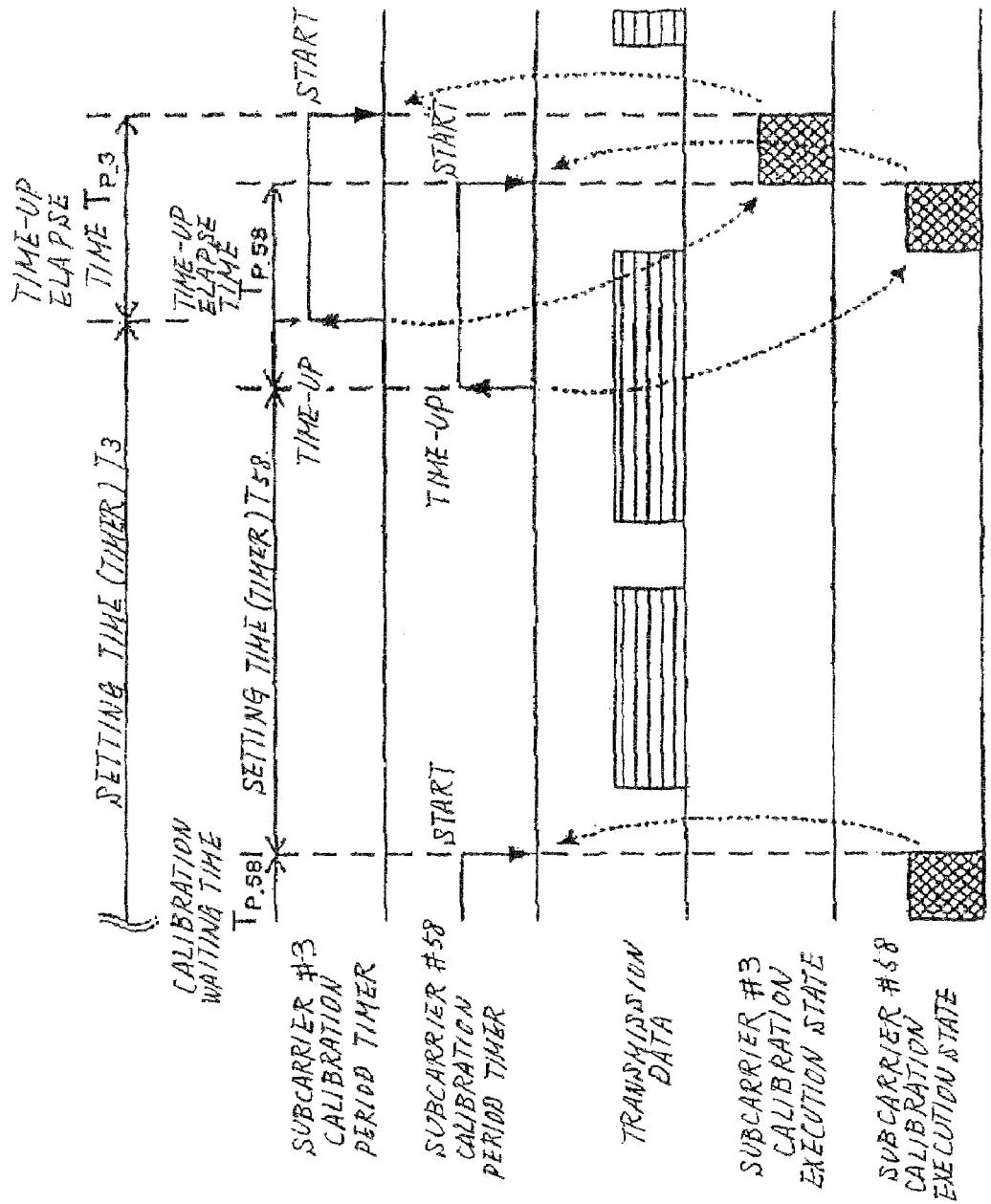
FIG. 25 is a timing chart of a calibration period timer, transmission data, and a calibration execution state in the third operational example shown in FIG. 24.

FIG. 25 shows a timing chart of the third operational example.

The timing chart of FIG. 25 illustrates an example in which subcarrier #3 and subcarrier #58 are calibrated, and shows a calibration period timer for subcarrier #3, a calibration period timer for subcarrier #58, transmission data, a calibration execution state for subcarrier #3, and a calibration execution state for subcarrier #58.

When the time measured by the calibration period timer for a subcarrier is up, calibration controller 63 starts the time-up elapse counter. When the calibration of the subcarrier is completed, calibration controller 63 resets the time-up elapse counter.

When the time measured by the calibration period timer for a subcarrier to be calibrated is up and there is no transmission data, if the number of time-up elapse counters for other subcarriers have been counted, then calibration controller 63 preferentially calibrates a subcarrier having the highest number of time-up elapse counter, from among all the subcarriers whose time-up elapse counters have been counted. Therefore, even in the event that there are calibration requests for two or more subcarriers, the subcarrier whose calibration waiting time is the longest can preferentially be calibrated.

With the third operational example, the calibrating process is carried out in a manner to clearly reflect variations in the amplitude characteristics and the phase characteristics of each branch, by changing the times $T_3$, $T_{58}$ set in the calibration period timers, as in the second operational example.

While the invention has been particularly shown and described with reference to exemplary embodiments thereof, the invention is not limited to these embodiments. It will be understood by those ordinarily skilled in the art that various changes in form and details may be made therein without departing from the spirit and scope of the present invention as defined by the claims.

What is claimed is:

1. A radio transmitting apparatus including a plurality of antenna elements, which is operable according to a multicarrier transmission process using a plurality of subcarriers, comprising:

a calibration reference signal generator for generating a calibration reference signal for each of the subcarriers to be calibrated for equalizing amplitude characteristics and phase characteristics of radio transmitters, that correspond to the antenna elements for each of the subcarrier, to predetermined reference values;

a subcarrier modulator for modulating the calibration reference signal generated by said calibration reference signal generator, with the subcarriers;

a radio transmitter for frequency-converting a baseband signal, which is the modulated signal output from said subcarrier modulator, into a transmission signal in a radio frequency band;

a radio receiver for frequency-converting the transmission signal in the radio frequency band, supplied from said radio transmitter to said antenna elements, into a baseband signal;

a calibration coefficient measurer for calculating a calibration coefficient from the baseband signal output from said radio receiver; and a calibration coefficient multiplier for multiplying a transmission signal for each of said subcarriers and each of said antenna elements, by the calibration coefficient calculated by said calibration coefficient measurer, wherein said calibration reference signal generator comprises, a calibration subcarrier selector for generating a calibration reference signal corresponding to a subcarrier to be calibrated, and a calibration reference signal switcher for selecting either a calibration reference signal supplied from said calibration subcarrier selector or transmission data supplied from said calibration coefficient multiplier at a predetermined time, and for outputting the selected calibration reference signal or transmission data to said subcarrier modulator, and wherein said calibration reference signal generator changes a period for outputting said calibration reference signal with which to start calibrating each of the subcarriers when each of the subcarriers is to be calibrated a plurality of times.

2. The radio transmitting apparatus according to claim 1, wherein said calibration coefficient measurer measures the amplitude and phase of the baseband signal demodulated by said radio receiver for each of the subcarriers, and calculates the calibration coefficient based on amplitude deviations and phase deviations between a measured values and a reference baseband signal.

3. The radio transmitting apparatus according to claim 2, wherein said calibration coefficient measurer measures the phase by detecting a time at which the polarity of the baseband signal output from said radio receiver is inverted.

4. The radio transmitting apparatus according to claim 1, wherein said calibration coefficient measurer measures the amplitude and phase of the baseband signal output from said radio receiver by performing discrete Fourier transform thereon for each of the subcarriers.

5. The radio transmitting apparatus according to claim 1, wherein said calibration reference signal generator changes the period for outputting said calibration reference signal, for each of the subcarriers depending on a deviation of said calibration coefficient due to the elapse of time.

6. The radio transmitting apparatus according to claim 1, wherein said calibration reference signal generator outputs said calibration reference signal when a time for outputting the calibration reference signal corresponding to said subcarrier has elapsed and there is no transmission data.

7. The radio transmitting apparatus according to claim 6, wherein said calibration reference signal generator preferentially selects, as the subcarrier to be calibrated, a subcarrier with respect to which a deviation of said calibration coefficient due to the elapse of time is the greatest, when there are a plurality of subcarriers with respect to which a time for outputting the calibration reference signal has elapsed and there is no transmission data.

8. The radio transmitting apparatus according to claim 6, wherein said calibration reference signal generator preferentially selects, as the subcarrier to be calibrated, a subcarrier with respect to which the time, after elapse of a time for outputting the calibration reference signal, is the longest, when there are a plurality of subcarriers with respect to which a time for outputting the calibration reference signal has elapsed and there is no transmission data.

9. The radio transmitting apparatus according to claim 1, wherein said calibration coefficient measurer determines said calibration coefficient in synchronism with the timing with which said calibration reference signal generator outputs said calibration reference signal.

10. A radio receiving apparatus including a plurality of antenna elements, which is operable according to a multicarrier transmission process using a plurality of subcarriers, comprising:

a calibration subcarrier generator for generating a modulation signal for each of the subcarriers to be calibrated for equalizing amplitude characteristics and phase characteristics of radio receivers, that correspond to the antenna elements for each of the subcarrier, to predetermined reference values;

a radio transmitter for frequency-converting the modulation signal generated by said calibration subcarrier generator into a signal in a radio frequency band;

a radio receiver for frequency-converting the signal in the radio frequency band which is output from said radio transmitter, into a baseband signal;

a subcarrier demodulator for demodulating the baseband signal output from said radio receiver, into a subcarrier signal;

a calibration coefficient calculator for calculating a calibration coefficient from the subcarrier signal output from said subcarrier demodulator; and a calibration coefficient multiplier for multiplying the subcarrier signal output from said subcarrier demodulator by the calibration coefficient calculated by said calibration coefficient calculator;

wherein said subcarrier demodulator only demodulates the baseband signal for a subcarrier to be calibrated, wherein said calibration subcarrier generator is capable of changing a period for outputting the modulation signal corresponding to the subcarrier and which is used to start calibrating each of the subcarriers when each of the subcarriers is to be calibrated a plurality of times.

11. The radio receiving apparatus according to claim 10, wherein said calibration subcarrier generator changes the period for outputting the modulation signal corresponding to the subcarrier, for each of the subcarriers depending on a deviation of said calibration coefficient due to the elapse of time.

12. The radio receiving apparatus according to claim 10, wherein said calibration subcarrier generator outputs said modulation signal when a time in which to output the modulation signal corresponding to said subcarrier has elapsed and there is no reception data.

13. The radio receiving apparatus according to claim 12, wherein said calibration subcarrier generator preferentially selects, as the subcarrier to be calibrated, a subcarrier with respect to which a deviation of said calibration coefficient due to the elapse of time is the greatest, when there are a plurality of subcarriers with respect to which a time for outputting the modulation signal has elapsed and there is no reception data.

14. The radio receiving apparatus according to claim 12, wherein said calibration subcarrier generator preferentially selects, as the subcarrier to be calibrated, a subcarrier with respect to which the time, after elapse of a time for outputting the modulation signal, is the longest, when there are a plurality of subcarriers with respect to which a time for outputting the modulation signal has elapsed and there is no reception data.

15. The radio receiving apparatus according to claim 10, wherein said calibration coefficient calculator determines said calibration coefficient in synchronism with the timing with which said calibration subcarrier generator outputs said modulation signal.

16. A radio transmitting method employing a plurality of antenna elements, which is operable according to a multicarrier transmission process using a plurality of subcarriers, comprising the steps of:

a) generating a calibration reference signal for each of the subcarriers to be calibrated for equalizing amplitude characteristics and phase characteristics of radio transmitting steps that correspond to the antenna elements for each of the subcarrier, to predetermined reference values;

b) modulating the calibration reference signal generated in said step a), with the subcarriers;

c) frequency-converting a baseband signal, which is the modulated signal output from said step b), into a transmission signal in a radio frequency band;

d) frequency-converting the transmission signal in the radio frequency band supplied from said step c) to said antenna elements, into a baseband signal;

e) calculating a calibration coefficient from the baseband signal output from said step d); and f) multiplying a transmission signal for each of said subcarriers and each of said antenna elements, by the calibration coefficient calculated in said step e), wherein said step a) comprises the steps of:

g) generating a calibration reference signal corresponding to a subcarrier to be calibrated, h) selecting a calibration reference signal supplied from said step g) or transmission data supplied from said step f) at a predetermined time to output the selected calibration reference signal or transmission data to said step b), and i) changing a period for outputting said calibration reference signal that is used to start calibrating each of the subcarriers when each of the subcarriers is to be calibrated a plurality of times.

17. The radio transmitting method according to claim 16, wherein said step e) comprises the steps of measuring the amplitude and phase of the baseband signal demodulated in said step d) for each of the subcarriers, and calculating the calibration coefficient based on amplitude deviations and phase deviations between a measured values and a reference baseband signal.

18. The radio transmitting method according to claim 17, wherein said step e) comprises the step of measuring the phase by detecting a time at which the polarity of the baseband signal output in said step d) is inverted.

19. The radio transmitting method according to claim 16, wherein said step e) comprises the step of measuring the amplitude and phase of the baseband signal output in said step d) by performing discrete Fourier transform thereon for each of the subcarriers.

20. The radio transmitting method according to claim 16, wherein said step a) comprises the step of changing the period for outputting said calibration reference signal, for each of the subcarriers depending on a deviation of said calibration coefficient due to the elapse of time.

21. The radio transmitting method according to claim 16, wherein said step a) comprises the step of outputting said calibration reference signal when a time for outputting the calibration reference signal corresponding to said subcarrier has elapsed and there is no transmission data.

22. The radio transmitting method according to claim 21, wherein said step a) comprises the step of preferentially selecting, as the subcarrier to be calibrated, a subcarrier with respect to which a deviation of said calibration coefficient due to the elapse of time is the greatest, when there are a plurality of subcarriers with respect to which a time for outputting the calibration reference signal has elapsed and there is no transmission data.

23. The radio transmitting method according to claim 21, wherein said step a) comprises the step of preferentially selecting, as the subcarrier to be calibrated, a subcarrier with respect to which the time, after elapse of a time for outputting the calibration reference signal, is the longest, when there are a plurality of subcarriers with respect to which a time for outputting the calibration reference signal has elapsed and there is no transmission data.

24. The radio transmitting method according to claim 16, wherein said step e) comprises the step of determining said calibration coefficient in synchronism with the timing with which said step a) outputs said calibration reference signal.

25. A radio receiving method employing a plurality of antenna elements, which is operable according to a multicarrier transmission process using a plurality of subcarriers, comprising the steps of:

a) generating a modulation signal for each of the subcarriers to be calibrated for equalizing amplitude characteristics and phase characteristics of radio receivers that correspond to the antenna elements for each of the subcarrier, to predetermined reference values;

b) frequency-converting the modulation signal generated in said step a) into a signal in a radio frequency band;

c) frequency-converting the signal in the radio frequency band which is output from said step b), into a baseband signal;

d) demodulating the baseband signal output from said step c), into a subcarrier signal;

e) calculating a calibration coefficient from the subcarrier signal output from said step d); and f) multiplying the subcarrier signal output from said step d) by the calibration coefficient calculated in said step e);

wherein said step d) comprises the step of only demodulating the baseband signal for a subcarrier to be calibrated, wherein said step a) comprises the step of changing a period for outputting the modulation signal that corresponds to the subcarrier in order to start calibrating each of the subcarriers when each of the subcarriers is to be calibrated a plurality of times.

26. The radio receiving method according to claim 25, wherein said step a) comprises the step of changing the period for outputting the modulation signal corresponding to the subcarrier, for each of the subcarriers depending on a deviation of said calibration coefficient due to the elapse of time.

27. The radio receiving method according to claim 25, wherein said step a) comprises the step of outputting said modulation signal when the time for outputting the modulation signal that correspond to said subcarrier has elapsed and there is no reception data.

28. The radio receiving method according to claim 27, wherein said step a) comprises the step of preferentially selecting, as the subcarrier to be calibrated, a subcarrier with respect to which a deviation of said calibration coefficient due to the elapse of time is the greatest, when there are a plurality of subcarriers with respect to which a time for outputting the modulation signal has elapsed and there is no reception data.

29. The radio receiving method according to claim 27, wherein said step a) comprises the step of preferentially selecting, as the subcarrier to be calibrated, a subcarrier with respect to which the time, after elapse of a time for outputting the modulation signal, is the longest, when there are a plurality of subcarriers with respect to which a time for outputting the modulation signal has elapsed and there is no reception data.

30. The radio receiving method according to claim 25, wherein said step e) comprises the step of determining said calibration coefficient in synchronism with the timing with which said step a) outputs said modulation signal.

* * * * *